April 30, 1968 J. S. CAMPBELL 3,380,511
APPARATUS FOR AUTOMATICALLY FILLING A RECEPTACLE
Filed May 25, 1964 14 Sheets-Sheet 1
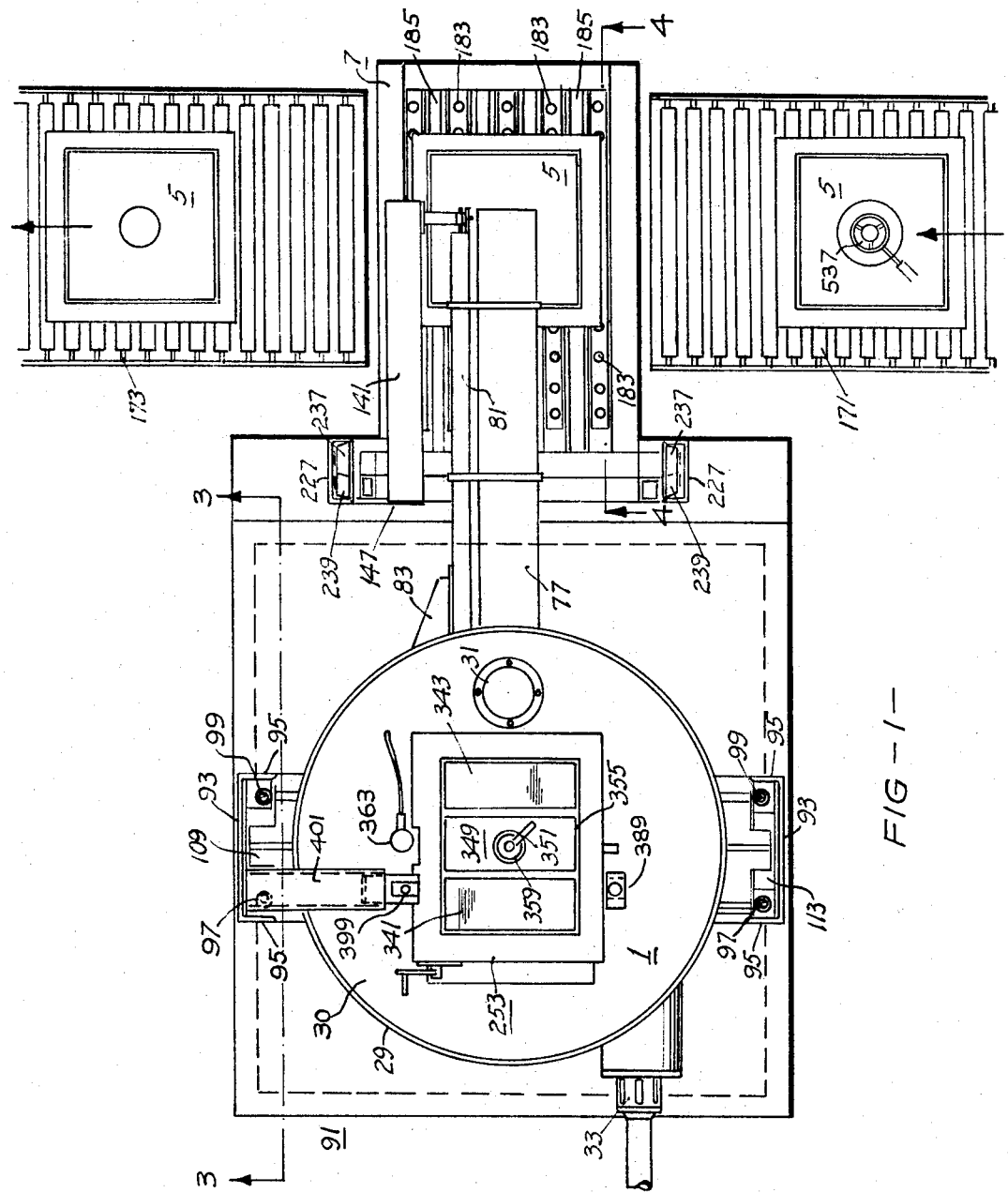
FIG-1-
INVENTOR.
JAMES SAMUEL CAMPBELL
BY
Bruce & Brosler
ATTORNEYS.

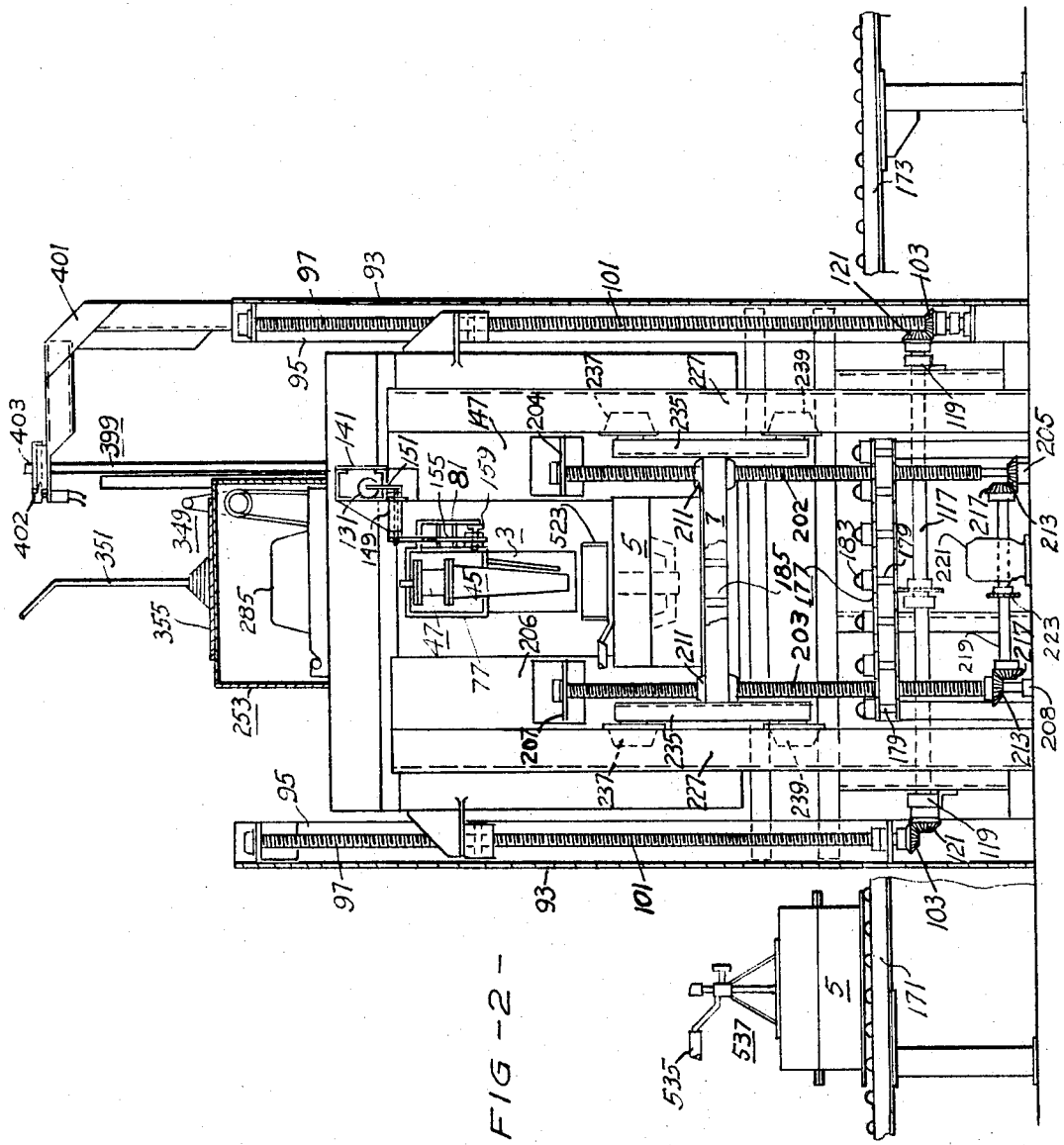

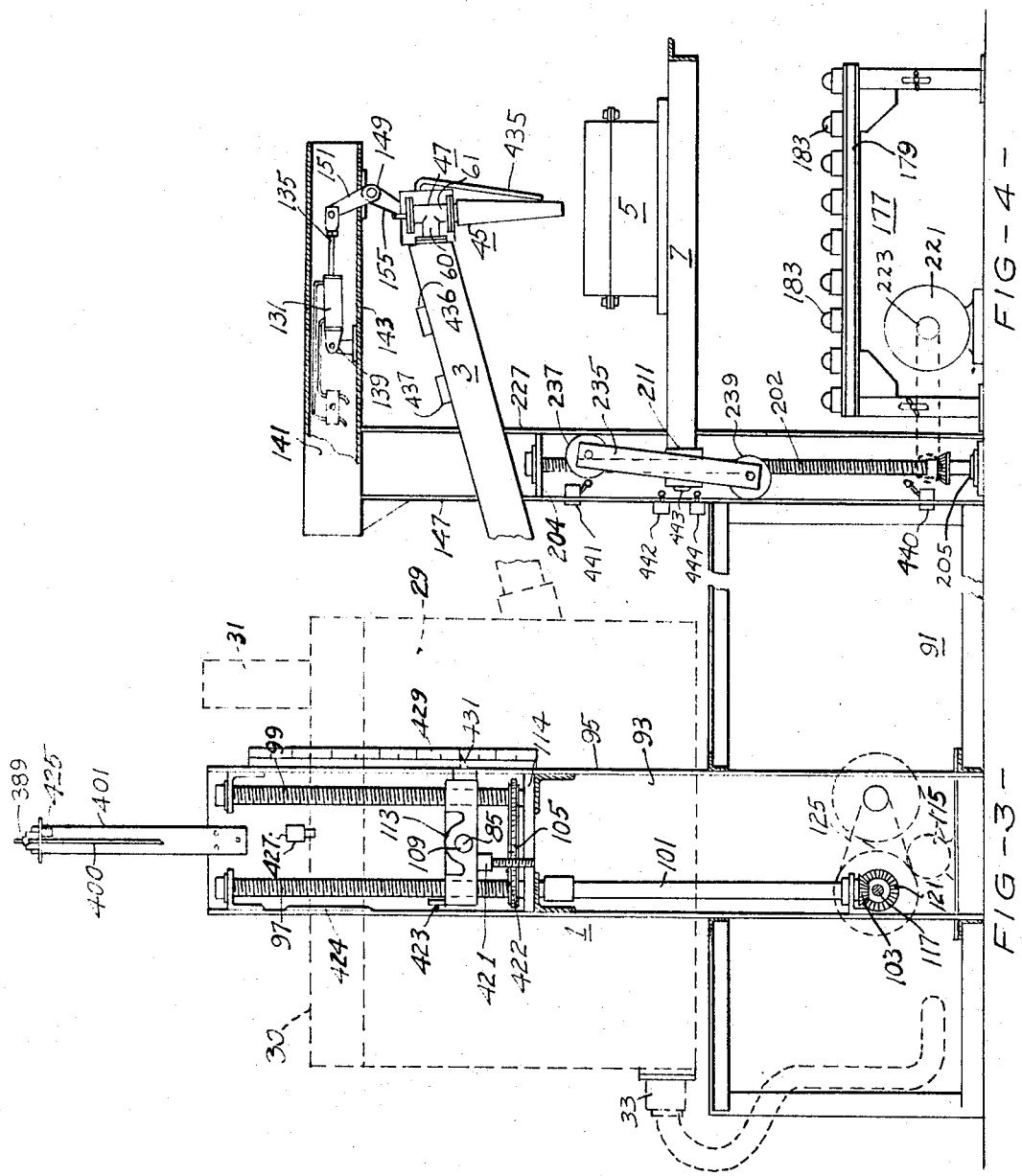

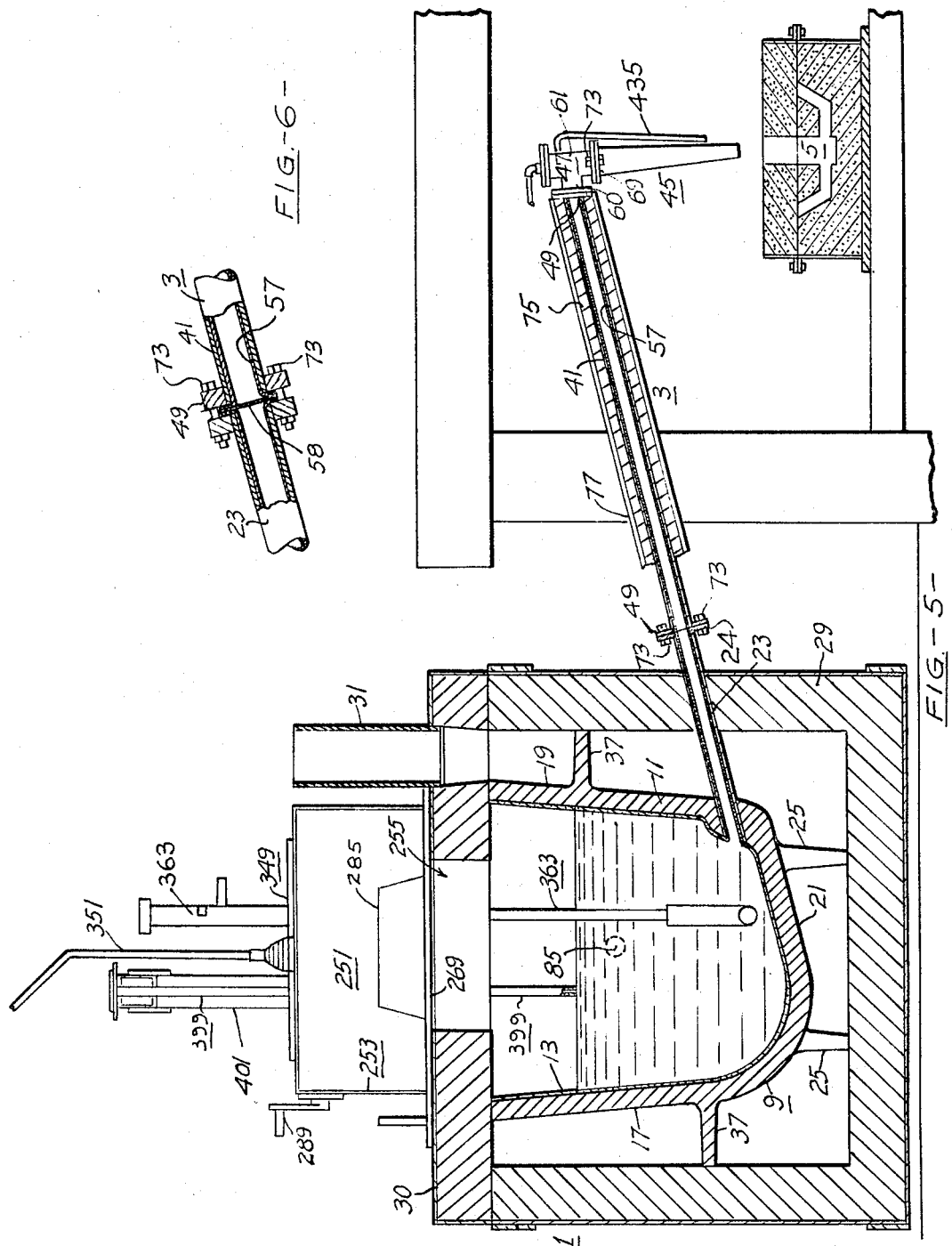

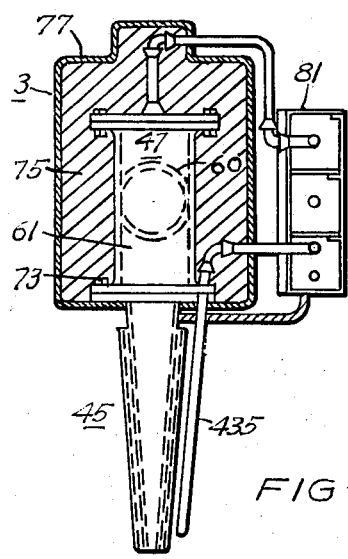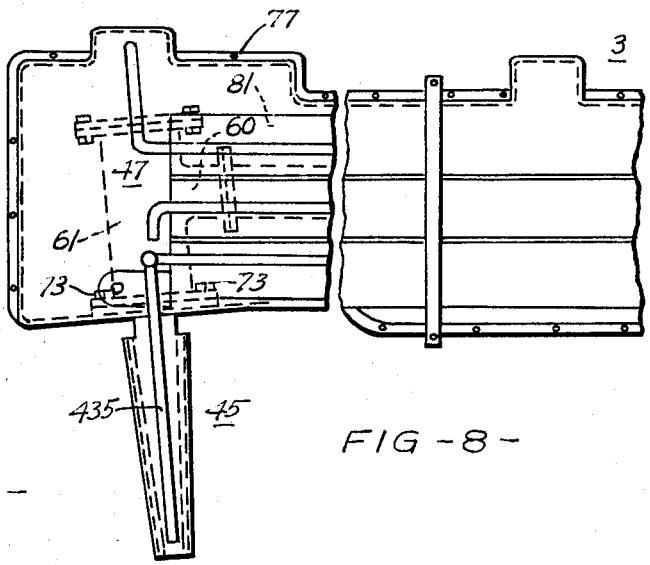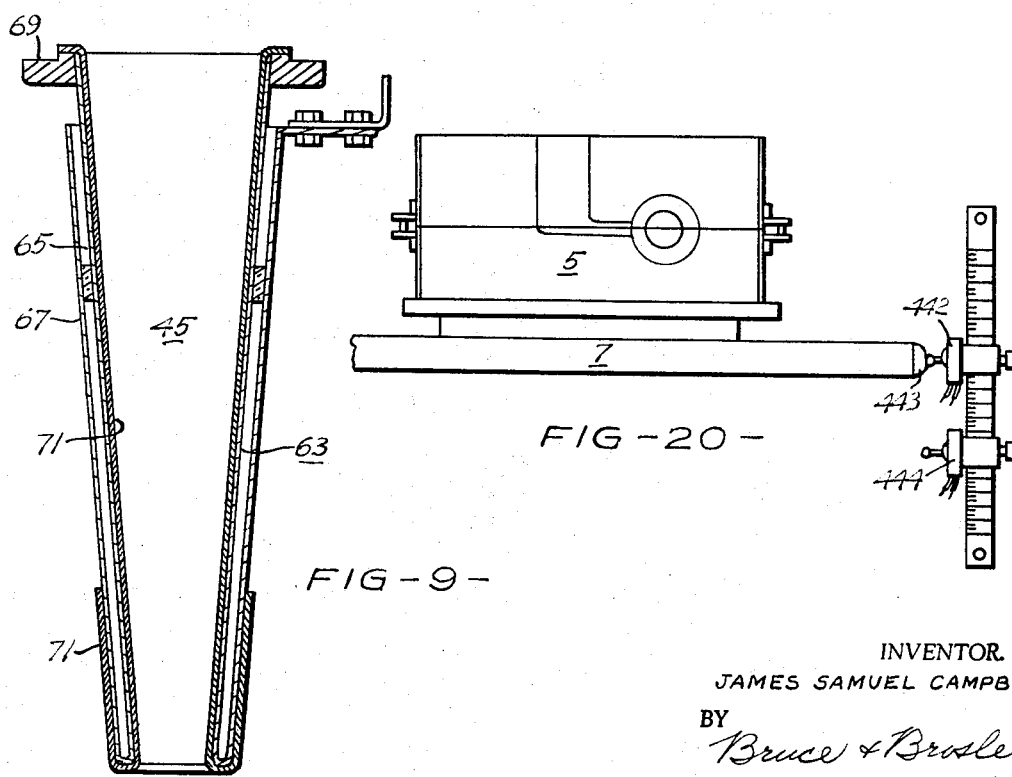

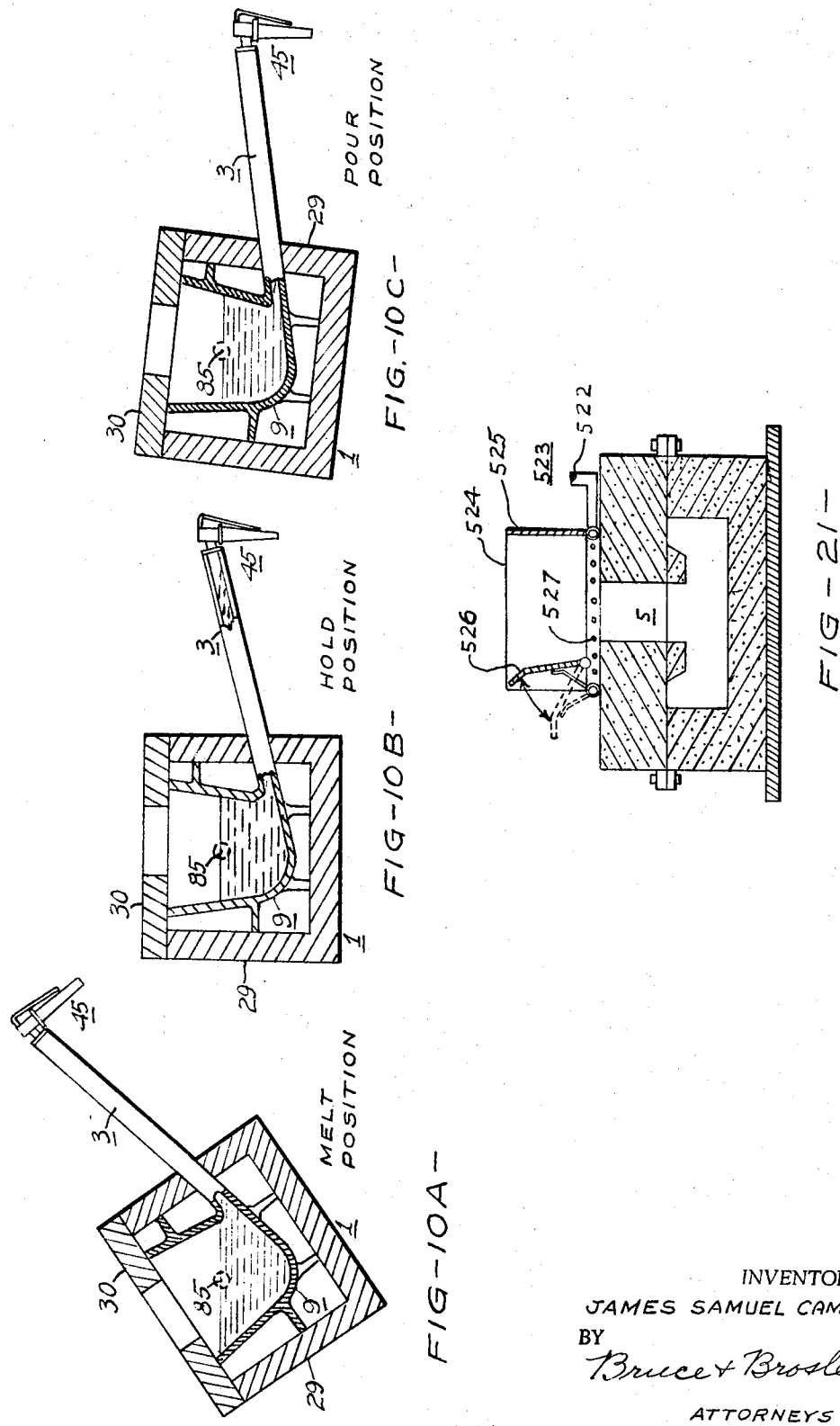

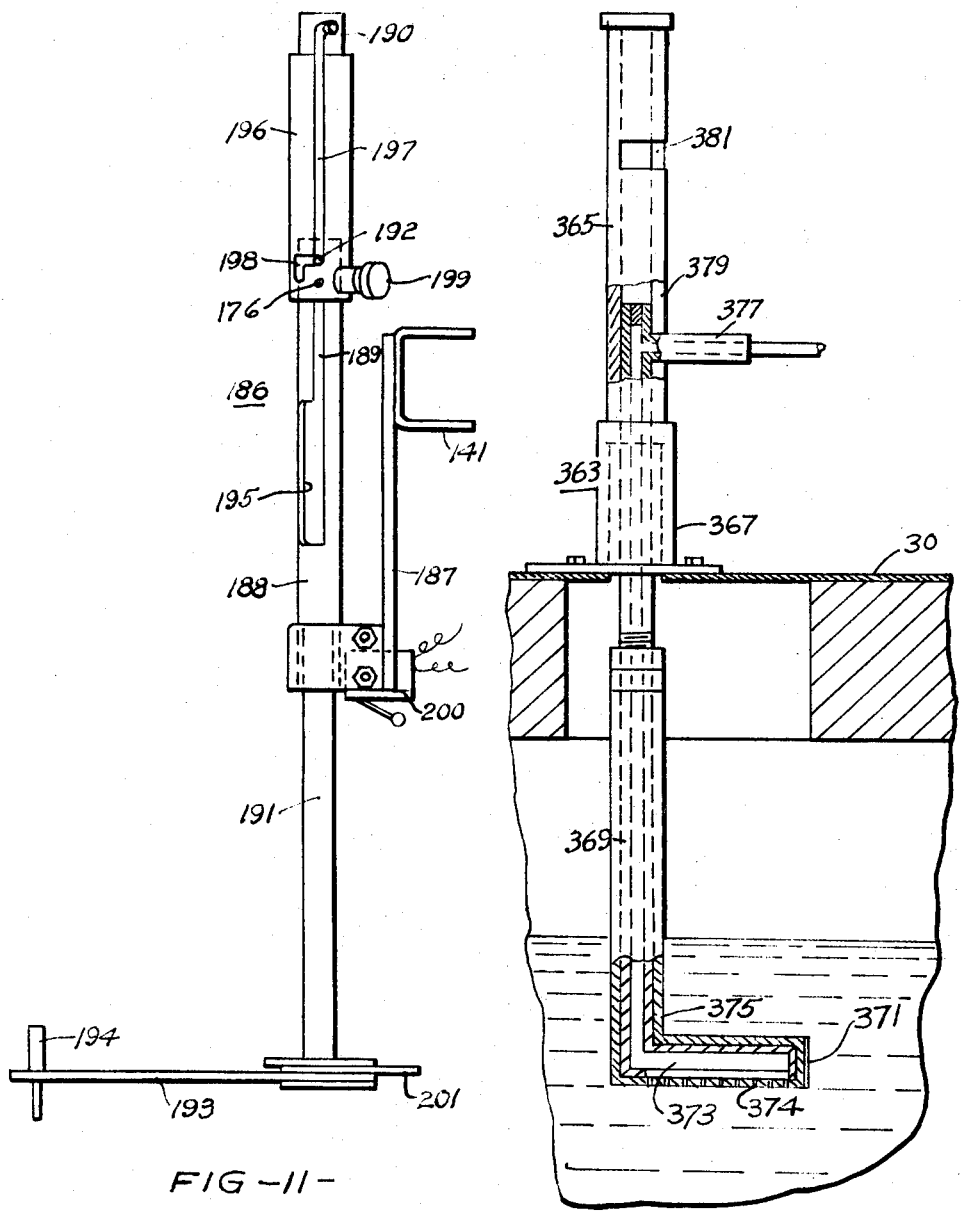

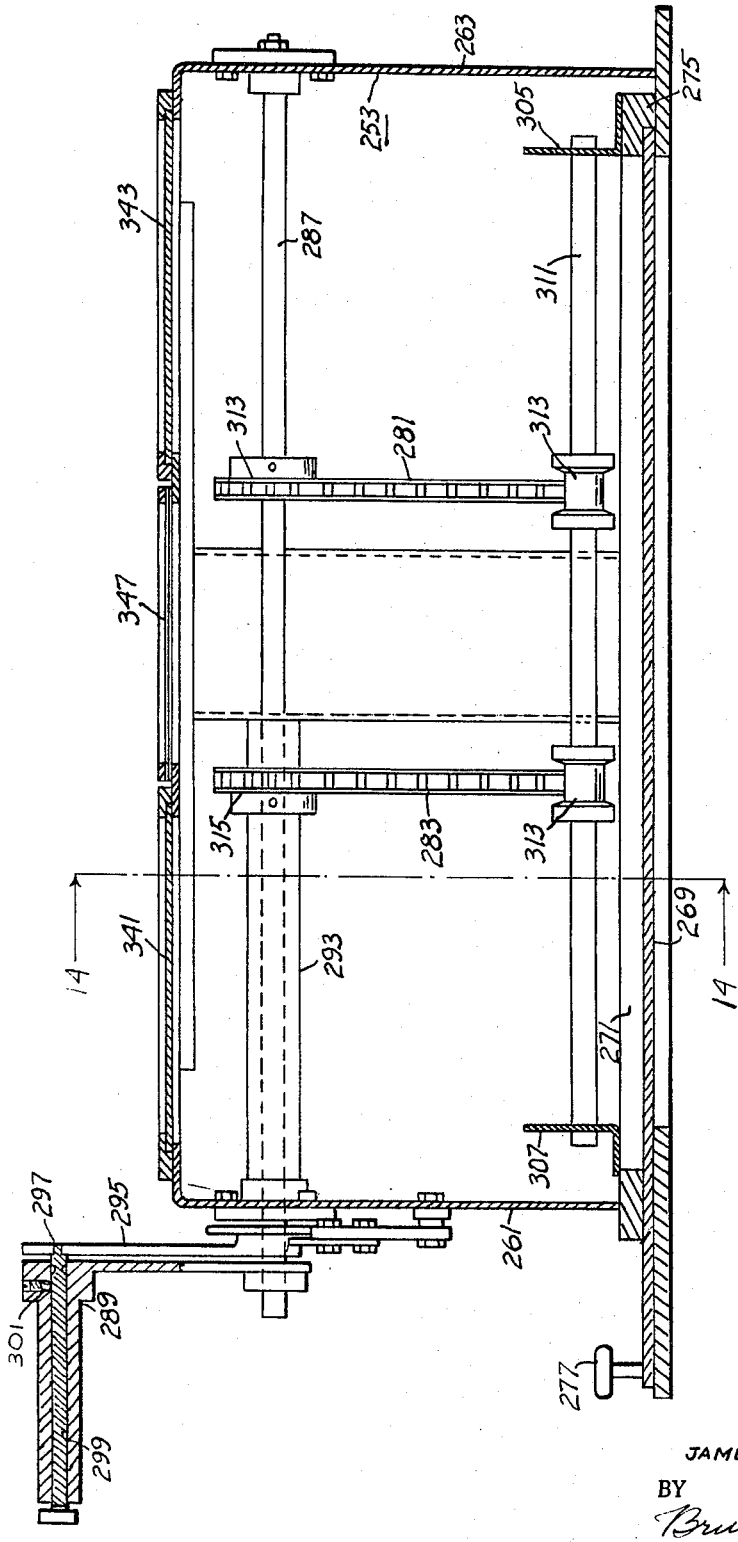
FIG-12-

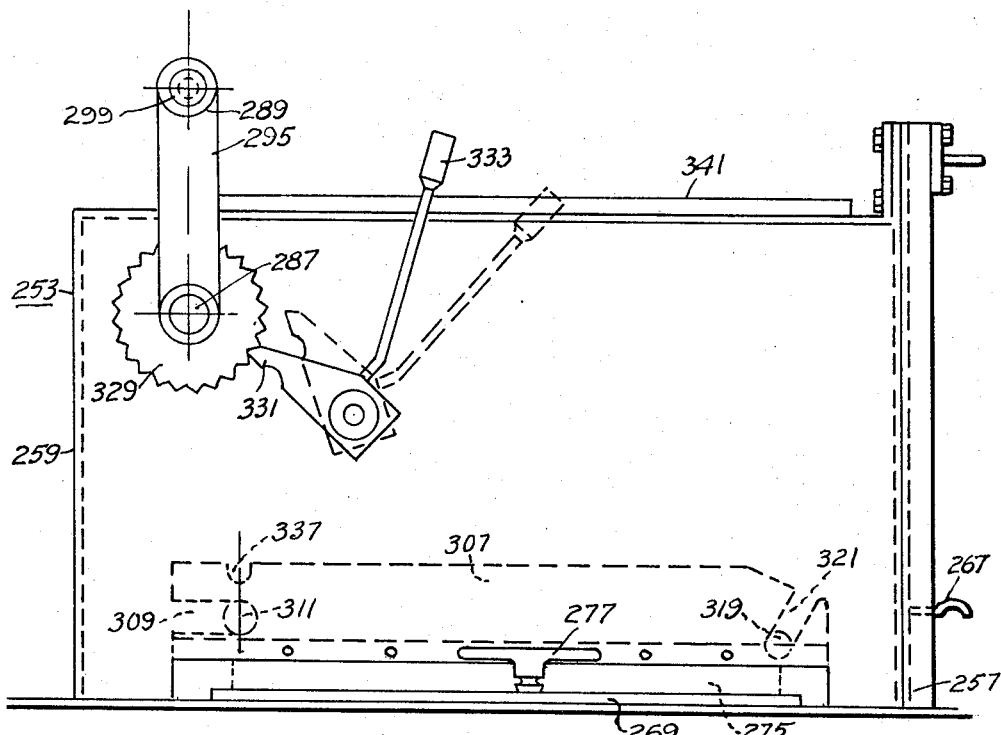
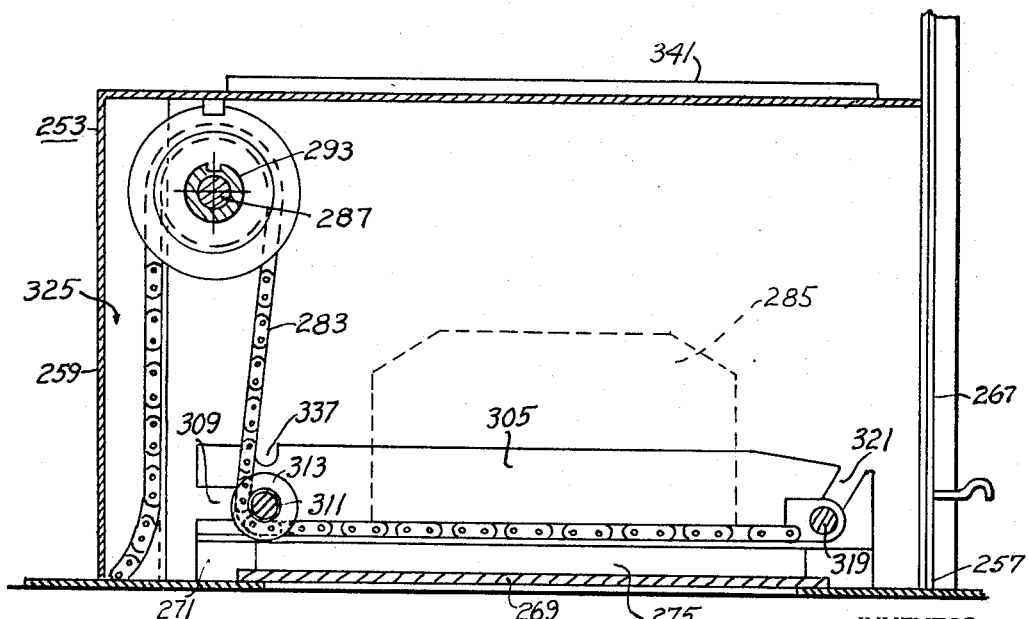

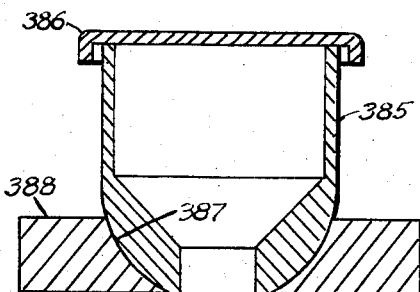
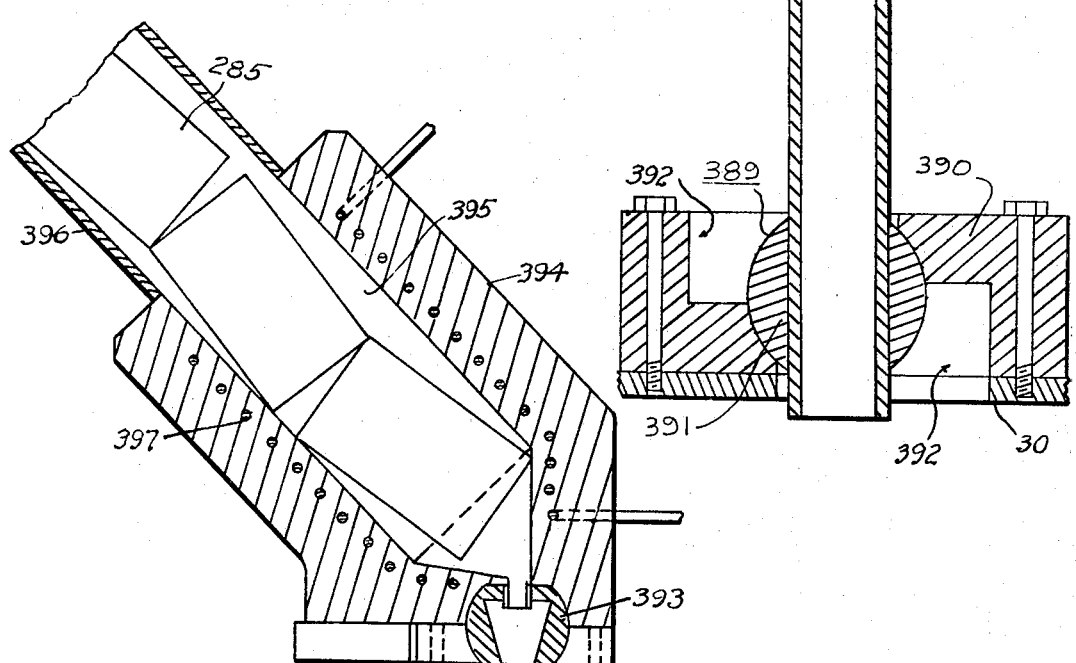
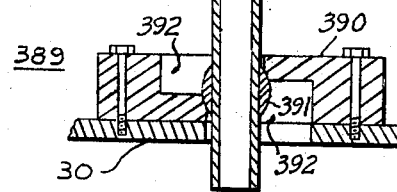

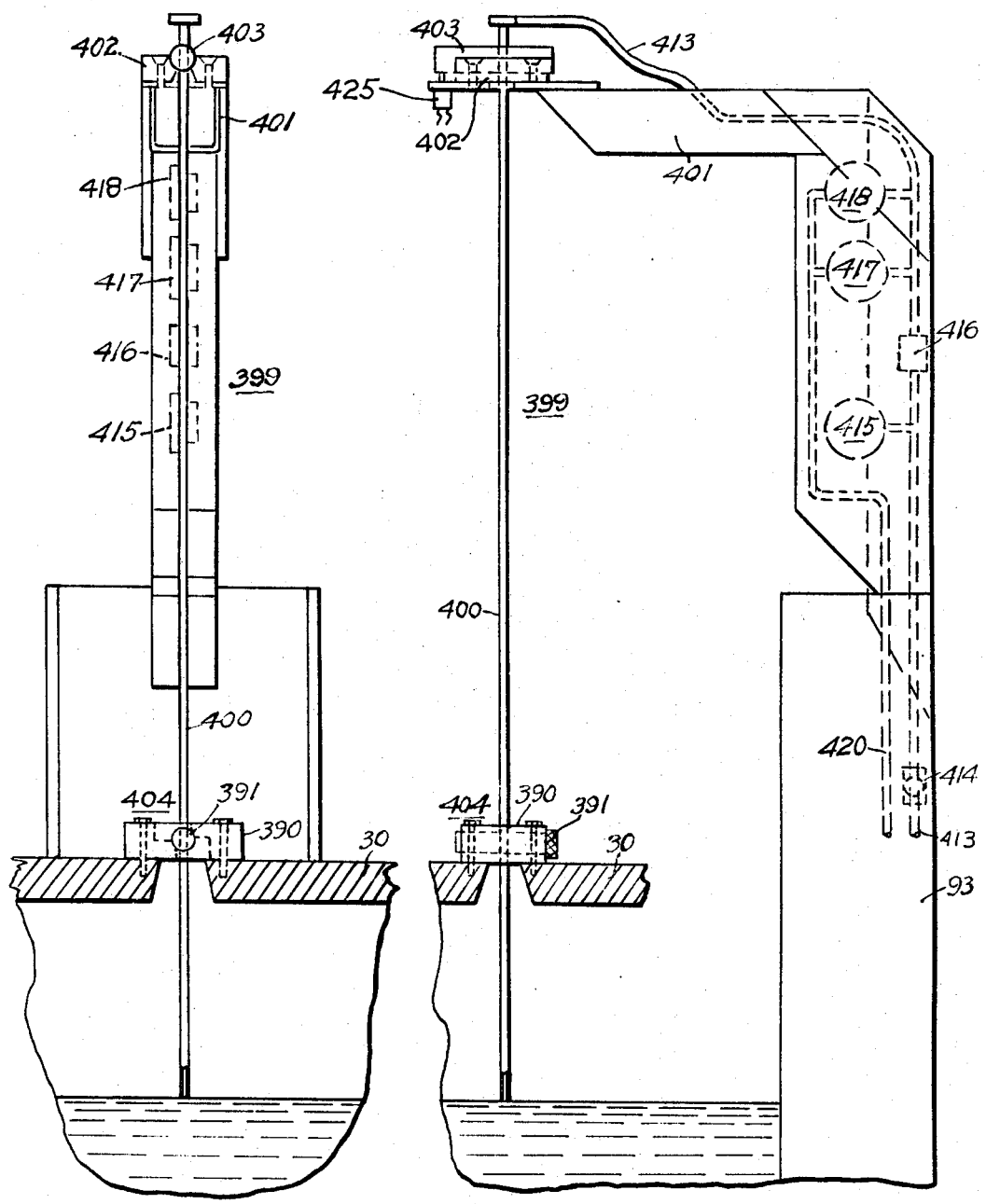

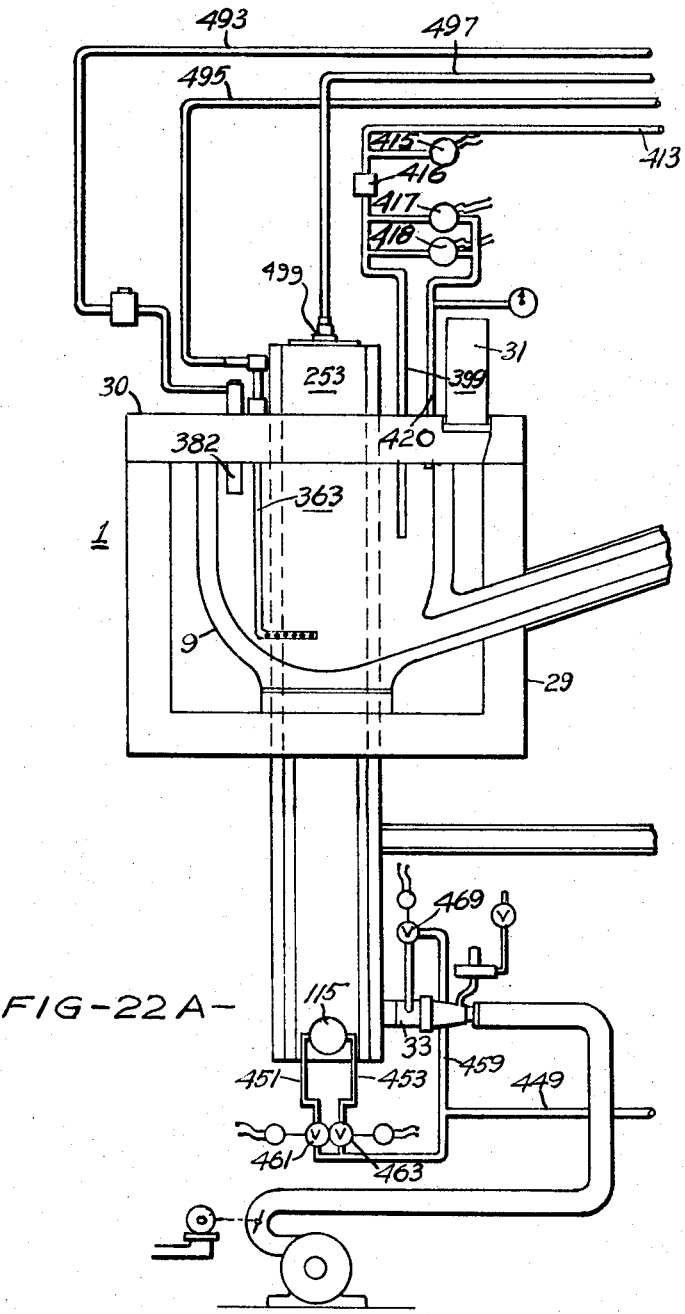

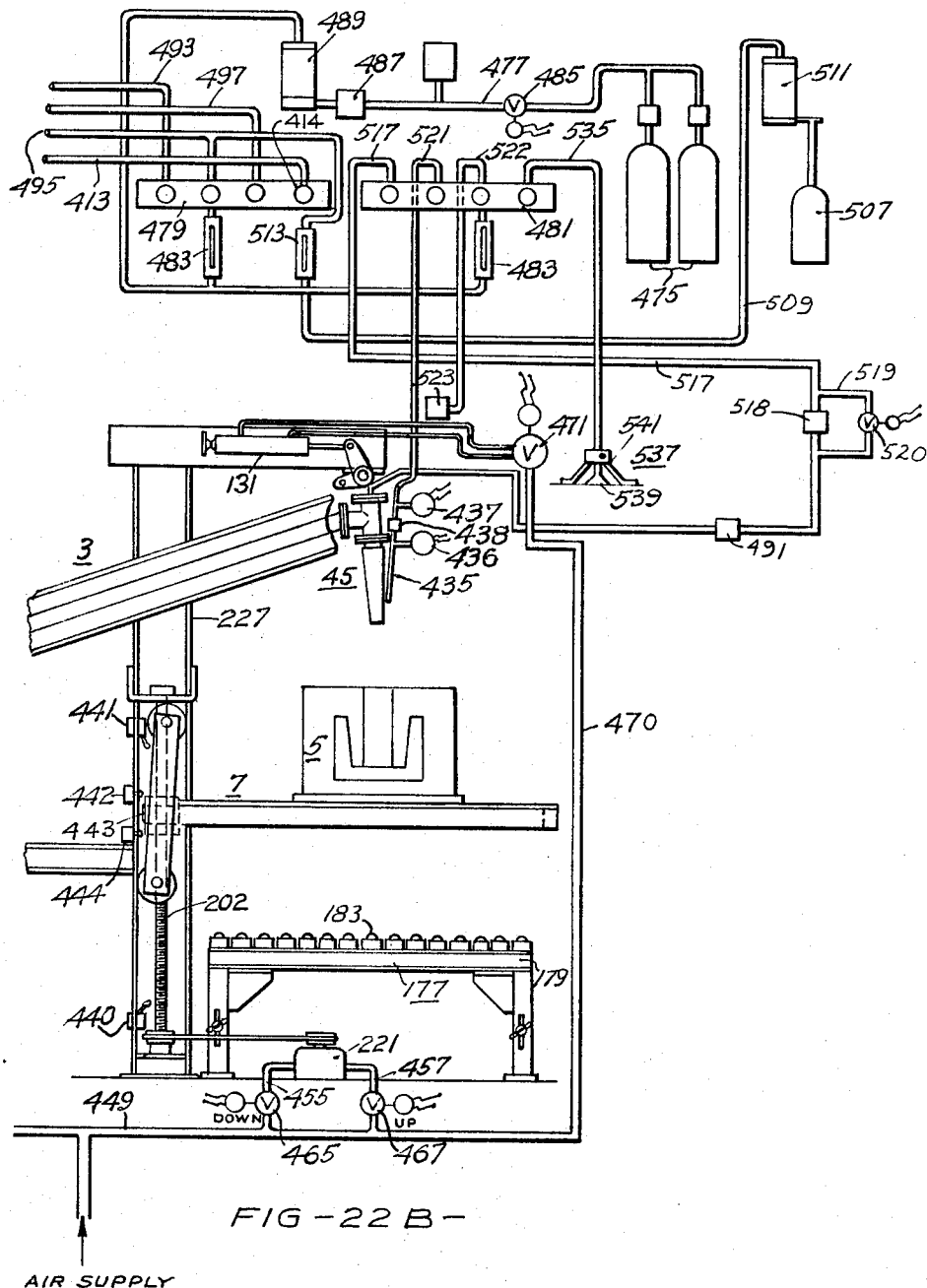
FIG-22B-
AIR SUPPLY

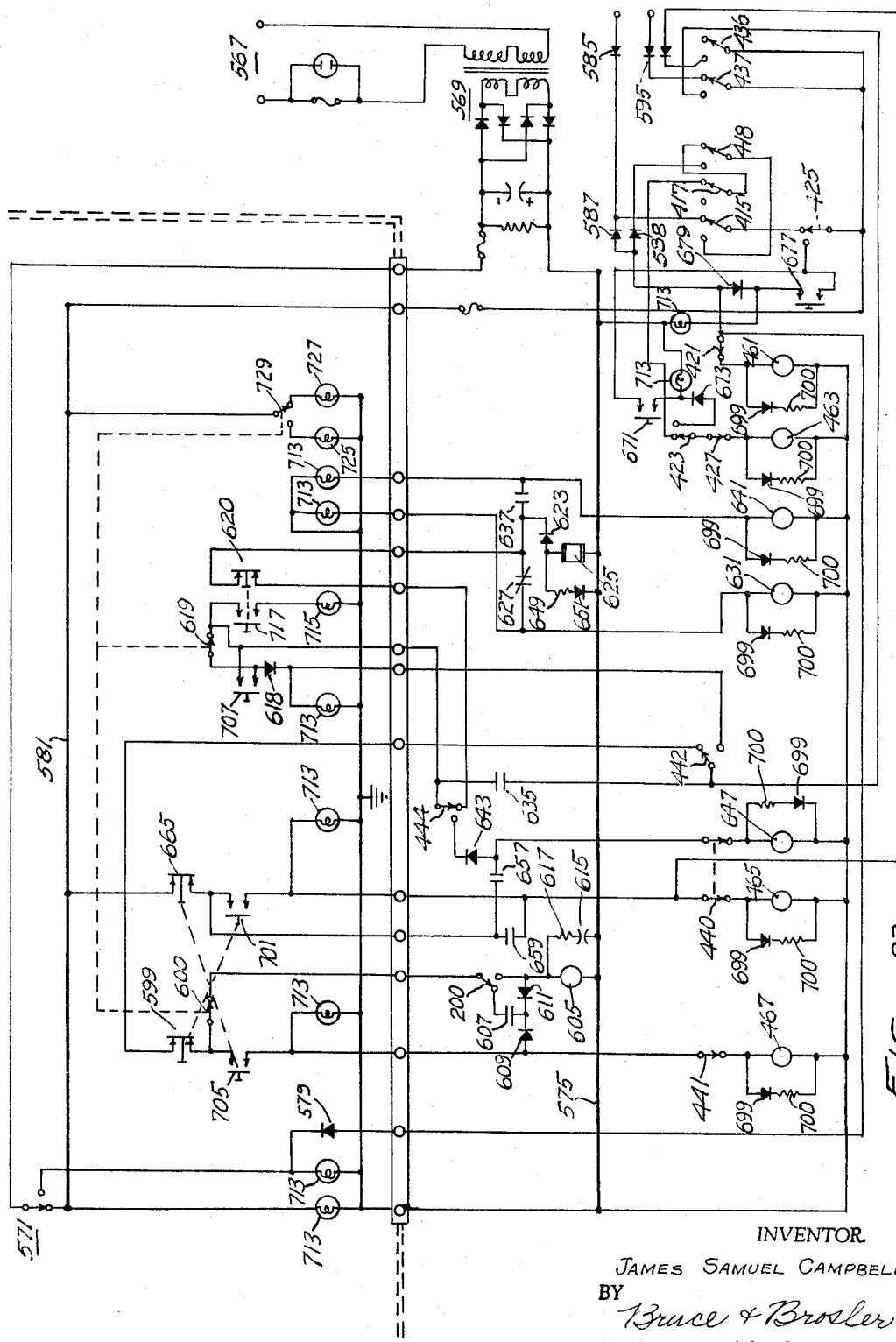
FIG. -23-
INVENTOR.
JAMES SAMUEL CAMPBELL
BY Bruce & Brosler
ATTORNEYS

United States Patent Office 3,380,511
Patented Apr. 30, 1968

3,380,511
APPARATUS FOR AUTOMATICALLY FILLING A RECEPTACLE
James Samuel Campbell, 74 Sleepy Hollow Lane, Orinda, Calif. 94563
Filed May 25, 1964, Ser. No. 369,669
2 Claims. (Cl. 164—155)

My invention relates in general, to the casting of metal, and more particularly to a system for such purpose.

In the casting of metal, it has been the common practice for centuries to transport the molten metal in open containers such as ladles, from which the molten metal is poured into molds and permitted to solidify therein. The resulting product, by reason of the previous exposure of the molten metal to atmosphere while being transported in the ladles, and under the turbulent conditions created during pouring of the molten metal through the gating passages within the mold, includes oxides of the metal, as well as undesired pores and pits, attributable to the absorption of undesirable gases.

It is evident that the cast metal properties can be immeasurably enhanced by avoiding exposure to the atmosphere, and previous attempts toward this end have not, to my knowledge, proved out too successfully.

Among the objects of my invention are:

(1) To provide a novel and improved system for casting metal, which system produces a dense non-porous casting;

(2) To provide a novel and improved system for casting of metal, wherein all metal which would otherwise be exposed to oxidizing atmospheres and other deleterious influences, is thoroughly protected throughout the system;

(3) To provide a novel and improved system for casting metal, in which the human element is minimized;

(4) To provide a novel and improved system for casting of metal, which is largely automatic in its operation;

(5) To provide a novel and improved furnace assembly for use in the handling of molten metal for casting or other purposes;

(6) To provide a novel and improved loading means for a furnace handling molten metal;

(7) To provide a novel and improved pouring tube assembly and included pouring nozzle for use in the foregoing system;

(8) To provide a novel and improved system for intermittent pouring of molten metal, which system functions without conventional type valves;

(9) To provide novel and improved degassing means for metal in molten condition;

(10) To provide a novel and improved apparatus for pouring a mold.

Additional objects of my invention will be brought out in the following description of the same taken in conjunction with the accompanying drawings wherein:

FIGURE 1 is a plan view of furnace and pouring apparatus involved in the present invention;

FIGURE 2 is a front view in elevation of the apparatus of FIGURE 1, with certain elements in section;

FIGURE 3 is a view in section approximately in the plane 3—3 of FIGURE 1;

FIGURE 4 is an elevational view in section taken approximately in the plane 4—4 of FIGURE 1, with additional portions broken away as indicated;

FIGURE 5 is a view in section through various components of the apparatus of FIGURE 1 to depict structural details involved;

FIGURE 6 is a view in section depicting a detail in the apparatus of FIGURE 5;

FIGURES 7, 8 and 9 are views depicting a nozzle assembly and associated structure, involved in the apparatus of FIGURE 1;

FIGURES 10A, 10B and 10C are comparative views illustrating operational characteristics of the apparatus of FIGURE 1;

FIGURE 11 is a view depicting a mold locator employed in the apparatus of FIGURE 1 to position a mold in preparation for casting;

FIGURE 12 is a view in section of a loading assembly for supplying solid metal to the furnace of FIGURE 1;

FIGURE 13 is an end view in elevation of the loading assembly of FIGURE 11;

FIGURE 14 is a view in section approximately in the plane 14—14 of FIGURE 12;

FIGURE 15 is a view, partly in section, of a degas tube assembly employed in the furnace apparatus of FIGURE 1;

FIGURES 16 and 17 are views in section, through furnace charging means adapted for supplying molten metal to the furnace apparatus of FIGURE 1;

FIGURES 18 and 19 are respectively, side and front views in elevation, of a furnace probe assembly employed in the furnace apparatus of FIGURE 1;

FIGURE 20 is a detail view illustrating structure relating to a mold filling control;

FIGURE 21 is a view in section through a flooder device for maintaining a mold in an atmosphere of inert gas during pouring;

FIGURES 22A and 22B together illustrate inert gas and air lines associated with the apparatus of FIGURE 1; and FIGURE 23 constitutes a diagram of the electrical circuits involved in the operation and control of the apparatus of FIGURE 1.

Referring to the drawings for details of my invention in its preferred form, the same involves a system which basically comprises a furnace assembly 1 having a pouring tube assembly 3 associated therewith for delivering molten metal from the furnace assembly to a mold 5 supported on an elevation adjustable mold platform 7, with means for maintaining all exposed molten metal in the system protected from adverse influences.

The heart of the furnace assembly lies in a furnace refractory pot 9 formed of a suitable material capable of handling a specific molten metal without contamination of such metal. For aluminum, the pot may be of cast iron 11 coated over its interior surface with any refractory material 13 capable of protecting the molten aluminum from contamination by the iron. One such material is known to the trade as "Kirkote." If the pot be made of silicon carbide, then no coating would be required.

The furnace pot is preferably formed to provide a rear wall 17 of the greater depth than the opposing or front wall 19, with a bottom 21 joining the front and rear walls, thereby causing the bottom to slope downwardly toward the rear wall with the pot in its normal position for filling. A pouring spout 23 terminating in a flange 24, extends from the front wall, substantially tangential to the bottom 21.

The furnace pot is supported on legs 25, or equivalent base, in an insulated cylindrical shell 29, including a cover or lid 30 having a flue 31 installed therein. Adjacent the bottom of the shell is a burner flame passageway such as to direct flame from an installed gas burner 33, against the lower regions of the furnace pot, from where the burning gas will be caused to rise about the pot to ultimately exhaust itself through the flue.

To more effectively control the flow of the heating gases along the furnace pot, as such gases rise from the burner to the flue, a spiral guide baffle 37 encircles the furnace pot, spanning the space between it and the surrounding shell. Such spiral guide baffle may well be cast integral with the pot.

This spiral baffle, in conjunction with the pot and the shell, defines a spiral flow path for the heating gases generated by the burner, whereby such gases must follow in such spiral path around the pot to bring about substantially uniform and efficient application of heat thereto.

The pouring tube assembly 3, includes a pouring tube 41, preferably of stainless steel or equivalent material, and carries a nozzle assembly 45, coupled to the free end of the pouring tube by a hollow T-coupling 47.

The pouring tube with a flange 49 at each end, is connected at one end to the flange 24 of the furnace pouring spout 23.

Because stainless steel may be attacked by molten aluminum, then if aluminum is to be handled thereby, the pouring tube, prior to assembling the same into the system, is lined with any suitable protective refractory material 57, preferably material available under the trademark "Fiberfrax," either as a cement or in the form of a paper.

Information as to this material and method of producing the same may be found in the patents to McMullen 2,557,834 of June 19, 1951; McMullen 266,821 of Aug. 17, 1954; Meaters 2,704,603 of Mar. 22, 1955; McMullen 2,710,261 of June 7, 1955; Nicholson 2,731,359 of Jan. 17, 1956; and Auer 274,336 of Apr. 24, 1956.

In accomplishing lining of the tube 41, the tube is temporarily closed at one end, following which, a certain amount of the "Fiberfrax" cement is poured into the tube, and by manipulation of the tube, the cement is caused to form a coating over the entire inner surface thereof.

Following this, the temporary closure is removed, and a piece of the "Fiberfrax" paper, cut to a length somewhat exceeding that of the section, is rolled up into a tube, to a diameter somewhat less than that of the pouring tube, and inserted into the pouring tube, following which, it is permitted to unroll, and if necessary, with the assistance of the individual performing the operation. This brings the paper of refractory material into contact with previously applied coating of cement, to which it bonds.

The free longitudinal edge of the paper, as thus installed, could preferably overlap slightly, but in such event the free overlapping edge should be held down or bonded to the proximate layer of the paper which it overlaps, as by the application of additional cement, which might be applied with a squeeze bottle having a long tubular extension snout.

The exposed ends of the paper lining which protrude slightly from each end of the tube, may then be trimmed off to approximately a quarter inch overhang, which is then carefully bent outwardly against the surface of the proximate flange and cemented thereto by the application of a thin layer of the "Fiberfrax" cement.

If the furnace spout 23 be of a material which might conceivably contaminate the molten metal being handled, it will be treated in the manner of the pouring tube 41, to provide it with a neutral refractory lining.

In assembling the pouring tube, as thus prepared, to the furnace spout, a gasket 58 is inserted between opposing flanges and the pouring tube is then bolted to the spout.

The T-coupling 47, involving a stem 60 and cross arm 61, is preferably flanged at its stem end, and at each end of its cross arm, and after being treated in the manner of the pouring tube 41, to provide it with a protective refractory lining throughout its internal surfaces and exposed coupling surfaces of its flanges, it is affixed at its stem end, with an intervening gasket, to the free end flange of the pouring tube, with the cross arm in a generally vertical direction.

The nozzle assembly 45 comprises a nozzle 63 which, like the pouring tube 41 and T-coupling 47, is formed preferably of stainless steel, with an inner wall 65 concentric with a shorter outer wall 67, both walls being joined along their bottom edges as by welding, to form the tip of the nozzle. The nozzle 63 is tapered in order to maintain a full flow of metal during pouring.

The inner wall of the nozzle terminates at its upper end in a flange 69 for coupling to the proximate flange of the cross arm of the T-coupling.

The inner surface of such inner wall 65 and the associated flange 69 are treated preferably in a manner similar to the pouring tube 41, prior to coupling the nozzle to the T-coupling, to provide protective refractory lining 71 which is extended out through the discharge tip of the nozzle and then carried up the outer surface of the outer wall 67 for a short distance, of the order of two or three inches, so that the tip of said nozzle will be completely protected by refractory material which is not attacked by molten aluminum or other molten metals.

In the absence of precautionary measures, the interior of the pouring tube assembly would be at a much lower temperature than the interior of the furnace, and accordingly would tend to lower the temperature of the molten metal as it poured out of the furnace through the pouring tube. This could chill the flowing metal, as well as deleteriously effect the metal in the resulting casting, and particularly since it would be quite difficult to maintain uniformity in the metal discharging from the nozzle.

I find it advantageous in controlling the temperature of the discharging metal, to heat the pouring tube assembly, along with the nozzle and T-coupling, and to a temperature of the order of that of the metal in the furnace. This I accomplish preferably by heating these components electrically; and in so doing, I take advantage of the electrical conductivity of the stainless steel involved in the fabrication of the pouring tube, T-coupling and nozzle, and electrically connect these components by stainless steel bolts 73 through the coupling flanges, the total cross-sectional area of the bolts at each joint being substantially equal to that of the pouring tube, so as to provide substantially uniform linear electrical resistance.

Through use of thermo-couples or other known temperature responsive means, the prevailing temperature of the metal in the furnace and that in the pouring tube may be accurately determined at all times, and therefore may be accurately controlled as by adjustment of the furnace heat, the electrical heating of the pouring tube and nozzle assembly, or both.

By applying a suitable voltage between a point such as that flange 49 of the pouring tube adjacent the pouring spout of the furnace assembly, and a point on the free edge of the outer wall 67 of the nozzle assembly, the desired heating may be realized.

Following the coupling of the nozzle assembly to the pouring tube by the T-coupling, the pouring tube, T-coupling and upper portion of the nozzle assembly are covered with a thick layer of heat insulation 75 and then encased in an enclosure 77 of the sheet metal.

Following this, the pouring tube and nozzle assemblies are rigidly supported in proper angular position with respect to the furnace assembly, by being bracketed or otherwise tied to a cantilever beam 81, affixed to the shell 29 by a bracket 83.

In the use of the furnace and pouring tube assemblies as described above, three main positions are contemplated, namely, a "melt" position, a "pour" position, and an intermediate "hold" position approaching the "pour" position, or in other words a position where the molten metal level in the pouring tube assembly approaches the highest point in the pouring tube and close to flowing over into the nozzle.

In the "melt" position of the furnace, the pouring tube assembly 3 will be directed upwardly at a rather steep angle, raising it and the pouring spout 23 entirely above the molten liquid level of the furnace pot in its full condition. In this condition, it will be apparent that the downward sloping bottom of the pot adds substantially to the capacity thereof.

The three positions noted may be realized by tilting the system about a pivotal axis 85 running through the furnace assembly at a point preferably slightly above the center of gravity thereof, and located horizontally to compensate for the weight of the pouring tube assembly and nozzle, such location assuring stability against self-tilting of the furnace in the direction of pouring.

By establishing a "hold" position approaching the "pour" position, the flow of molten metal through the nozzle may be caused to start and stop at will, thus realizing the effect of valve action without the use of a valve of any conventional type. This becomes exceedingly important in a system handling molten metal, for it will be apparent that where molten metal, during non-use periods of the apparatus, will freeze or solidify, mechanical valves cannot very well handle such a situation, still less in a practical manner.

It will be appreciated, however, that by pouring about a fixed pivotal axis of the furnace assembly, the pouring position of the nozzle will necessarily change to a lower position as the contents of the furnace is being depleted, so that, between the liquid level in the furnace representing a full condition, and the liquid level as the furnace approaches its empty status, the "pour" positions of the nozzle will have transcribed a rather wide arc. Such changing of the "pour" position of the nozzle would be quiate undesirable, as introducing too many variable movements at the nozzle end of the system which would have to be taken into consideration in the application of the nozzle to the filling of molds.

Stability of the "pour" position of the nozzle could be realized by supplying the furnace with molten metal at a rate commensurate with the rate of discharge from the nozzle, so as to maintain a fixed level of molten metal in the furnace pot. Such requirement, would also be undesirable, as introducing too many complicating factors in the operation of such system.

I avoid these complications by providing a pivotal mounting for the furnace assembly, which mounting is not fixed, but is adjustable as to elevation in accordance with any drop in liquid level of the molten metal therein, and by this expedient, the "pour" position of the nozzle as well as the "hold" position may be maintained or stabilized at fixed locations, thus greatly simplifying the operation of filling a mold through said nozzle.

As previously indicated, the pivotal axis will preferably be through the furnace at a point slightly above its center of gravity, and horizontally located such as to facilitate tilting of the same with minimum effort, yet assure that the furnace assembly and associated apparatus will, when unrestrained, remain upright and restrain itself against self-tilting in the pouring direction.

Its contemplated lower position in the vertical adjustability range, will be such as to permit pouring with a "full" furnace load. As the load diminishes, the furnace assembly may be elevated to maintain continuous flow of molten metal through the pouring tube assembly without disturbing the elevational position of the nozzle.

Such adjustable mounting for the furnace, involves a base frame assembly 91, from opposite sides of which rise a pair of suitably braced uprights preferably in the form of inwardly facing channel beams 93, each having opposing flanges 95.

In the upper portion of each of the upright channels and longitudinally thereof, are rotatably mounted a pair of adjusting screws 97, 99, preferably provided with an acme thread. One of said screws 97 has a downwardly extending shank 101 terminating in a miter gear 103 within the base frame for effecting a drive connection to such screw. A crossbar 114 in each channel serves as an intermediate brace for the drive screw and a support at the lower end of the associated driven screw. Resulting rotation of this screw is caused to impart a corresponding rotation to the other screw 99 and in proper direction, by a sprocket and chain drive coupling 105 between the two screws.

These four adjusting screws serve as supports for the furnace assembly, the shell 29 being provided with oppositely spaced mounting trunnions 109 which are journalled in carriage blocks 113, each of which is adjustably carried by the proximate pair of screws 97, 99. Accordingly, simultaneous rotation of these supporting screws, will cause vertical movement of the furnace assembly in either the up or down direction, in accordance with the direction of rotation of such supporting screws.

Rotational drive of the supporting screws is accomplished from a drive motor 115 mounted within the base frame. A drive shaft 117 supported transversely of the base frame in suitable bracket mounted bearings 119, terminates at each end in a miter gear 121 which is in mesh with the miter gear 103 affixed to the lower end of the proximate screw shank 101. The drive shaft is drive connected to the motor, preferably by a chain and sprocket drive 125.

Adjustment of the system from "melt" to "hold," for smaller capacity furnaces, is preferably performed manually, due to the relatively long swing of the nozzle between these two positions and the ease with which this can be accomplished manually. From the "hold" to "pour" position, the swing will be short, and this can be readily controlled by providing a cylinder 131 pivotally anchored at one end to any suitable fixed point, and an included piston having a piston rod 135 adapted to be readily connected to and disconnected from a point on the cantilever beam 81.

Between the "hold" and "pour" positions of the nozzle, operations of this piston may be effected by the introduction into the cylinder 131, of compressed air or a liquid under pressure, to one side or the other of its piston. The point of connection of the piston to the cantilever beam becomes quite critical if the nozzle "pour" position is to remain the same at all times, and should be within the vicinity of the high point of the pouring tube assembly or in horizontal alignment with the nozzle, to bring the nozzle close to the fulcrum axis provided by such connection. Otherwise, the nozzle might find itself at the end of a substantial fulcrum arm, whereby it will be caused to swing through a substantial arc with vertical adjustments of the furnace assembly.

The fixed point of anchorage for the cylinder 131 may be provided by a fulcrum bracket 139 mounted within a horizontally disposed channel beam 141 on the lower flange 143 thereof. This channel beam is supported as a cantilever beam from the upper end of a vertical plate 147 affixed to the front of the base frame of the furnace assembly to one side of the pouring tube assembly, the channel beam extending to a point somewhat beyond and above the nozzle assembly.

In vertical alignment with the nozzle assembly, the lower flange of the channel beam is cut away to provide for the mounting of a bearing 149 for a bell crank lever 151, one arm of which extends through the cut away portion of the flange into the channel beam for connection to the piston rod 135, while the other arm of the bell crank lever is releasably coupled to the desired point on the pouring tube supporting beam 81, through a link 155, such link being important to permit any slight rocking movement of the nozzle, which might be occasioned by the vertical adjustments of the furnace assembly.

Any quick connect and disconnect coupling may be employed to effect the connection of the coupling link to the pouring tube supporting beam, and may preferably take the form of a manually controllable latch pin 159 engaging a perforation or hole in the beam or a tab affixed to such beam, as the situation may require. Such coupling is required when shifting the nozzle between its "hold" and "pour" positions, but is disconnected when the furnace assembly is to be tilted to its "melt" position with the nozzle and pouring tube assembly above the contemplated liquid level in the furnace pot when tilted to such position.

The above described apparatus, places the nozzle assembly in an ideal position for the filling of molds, whether they be sand molds or die casting molds, and ideally lends itself to automatic or semi-automatic pouring of successive molds conveyed to a filling station under the nozzle by a conveyor 171 and removed from such filling station by another or similar conveyor 173.

This may be realized by locating between the discharge end of the one conveyor 171 and the take-on end of the other conveyor 173, a mold locating ball transfer conveyor 177, involving an elevated horizontal platform formed of a plurality of parallel spaced I-beams 179 on which are mounted a plurality of socket mounted balls 183 arranged in a plurality of spaced rows adapted to support a mold and permit the shifting thereof in order to properly locate the pouring opening thereof in alignment with the nozzle above.

To effect a ready transfer of a mold from the supplying conveyor 171 to the mold locating ball transfer conveyor 177, and from there to the other conveyor 173, the supporting plane of the balls should lie in the carrying plane of the associated conveyors.

The mold platform 7 is formed of a plurality of parallel bars 185 so spaced as to fit between the rows of balls, and are of a height such that when disposed upon the mold locating ball transfer conveyor 177, the balls will extend slightly above the carrying plane of the mold platform.

Upon lifting the mold platform from such position, it will automatically remove any mold being supported on the balls, thus causing such mold to be lifted to an elevation in preparation for pouring the same.

Prior to elevating the mold platform, it is essential to locate the mold with its pouring opening in line with the pouring nozzle.

To so locate a mold, I provide a mold locator assembly 186 comprising a bracket 187 affixed to and suspended from the channel 141, and in which is vertically clamped a tube 188. This tube has a longitudinal slot 189 extending upwardly from approximately the bracket to a point approaching the upper end of the tube, where it terminates in an offset 190.

Slidably fitting the tube 188 is a rod 191, which at its upper end carries a guide pin 192 extending through the slot 189, while from its lower end, the rod carries a radial arm 193 at the end of which is a mold locator pin 194.

To permit limited swinging movement of the pin in a horizontal plane, from a position in line with the nozzle to a position where it will not obstruct subsequent vertical lifting of a mold, the lower end of the slot 189 is widened with one edge 195 functioning to stop the pin when in line with the nozzle above.

As thus far described, the rod 191 may be elevated for storage by engaging guide pin 192 in the offset 190 of the slot 189, or it may be lowered until the pin 192 reaches the lower end of the slot. Under these conditions, the mold locator can function only with molds which do not reach the plane of movement of the mold locator pin 194.

To properly position molds of greater height, a short sleeve 196 having a sleeve guide pin 176 and a slot 197 extending from its upper edge almost to its lower edge where it terminates in an offset 198 matching the wide lower end of the slot 189 of the tube, is installed with the rod guide pin 192 extending into this slot. A control knob 199 adjustably threaded into the sleeve adjacent its lower end, will enable one to adjust the sleeve along the tube and lock it at any desired point. The offset 198 may then be considered as constituting an adjustable lower end for the slot 189, and when located anywhere within the widened portion of slot 189, the mold locator pin 194 may function.

Mounted on the bracket 187 is a micro-switch 200 of the single pole double-throw type, adapted to be engaged by any conveniently located portion of the mold locator, or a tab 201 extending from the lower end of the rod 191, when the rod is elevated to its stored position. This switch functions in a manner, subsequently to be described, in sequencing operations of the furnace and associated apparatus.

The apparatus for elevating the mold platform, following location of the mold thereon, is in some respects similar to that for adjusting the elevation of the furnace assembly, in that it employs adjusting screws 202, 203, preferably having acme threads. One such adjusting screw 202 is journalled at its upper end in a mounting bracket 204 affixed to the vertical plate 147, and at its lower end in a floor level bearing 205. A similar vertical plate 206 to the other side of the pouring tube assembly, carries a like bracket 207 for supporting the upper end of adjusting screw 203, which in turn is journalled at its lower end in a floor level bearing 208.

The mold platform 7 is adjustably supported on these screws by means of nuts 211 to which the mold platform is connected, whereby upon simultaneous rotation of these adjusting screws, the mold platform will move vertically in an up or down direction depending upon a direction of rotation of such screws.

Each screw carries at its lower end, a mitre gear 213, one reverse with respect to the other, with both such mitre gears engaged by a mitre gear 217 on the ends of the transverse drive shaft 219, which in turn is coupled to a suitable drive motor 221 by a sprocket and chain drive connection 223.

The mold platform being cantiliver mounted, will, in the absence of compensatory means, impart great moment stresses to its supporting adjusting screws 202, 203, and particularly with a mold on such platform. To relieve these screws of such stresses, a vertically disposed inwardly facing channel beam 227 is affixed to the base frame of the furnace assembly along the outer edge of each of the vertical plates 147, 206 which carry the adjusting screws.

To each corner of the mold platform at its supported end, is a mold carriage comprising a frame 235, at each end of which is a wheel 237, 239 respectively, the frame being so angled so as to bring the upper wheel in contact with the front flange of the proximate channel beam, and the lower wheel in contact with the rear flange, with the mold platform in substantially a horizontal plane. Such turning moments as will be created by the mold platform and any load carried thereby, will thus be counteracted by the mold carriages, thereby taking the strain off the adjusting screws and permitting freedom of adjustment with a minimum of probability of binding.

As one step in the direction of incorporating the above described apparatus into a closed system for the handling of molten metal, I provide a furnace loading device assembly 251, which co-operates with the furnace assembly to enable an operator to load solid metal or ingots into the furnace, without allowing harmful gases such as oxygen and water vapor to gain access to the furnace. This loader is intended for use whenever the furnace interior temperature is near or above the melting temperature of the metal, a condition which exists when fresh metal in its solid state is to be added to the molten metal in the furnace to replenish a diminishing supply. The loader may also be used when solid metal is to be added to a hot empty furnace, as when changing alloys.

The loader takes the form of a substantially rectangular housing 253 adapted to be removably bolted or otherwise affixed to the cover 30 of the furnace assembly, in position to span a filling opening 255 through the cover to the furnace pot below. Any suitable gasket or other sealing means may be employed to effect sealing of the housing to the cover to minimize intake of air into the housing.

The housing comprises opposed side walls 257, 259 connected by end walls 261, 263, one of the side walls being provided with a vertically slidable door 267 for providing access to the interior of the housing.

Spanning the opening into the furnace is a horizontal door 269 slidably fitted into suitable guide ways 271 extending along the lower edges of the side walls thereof and terminating adjacent the end wall 263 in a cross member 275 of similar cross section as the guide ways. The horizontal slidable door, in its closed position, extends outwardly of the housing beneath the end wall 261, and is provided with a handgrip 277 to facilitate sliding of said door to an open position exposing the opening to the furnace.

Such loader construction thus provides an air-lock type loading chamber, whereby metal in its solid state may be loaded into the chamber through the side wall door 267 while the horizontal door is in its closed position, and then following closing of the loading door, and purging the chamber of atmospheric or any other undesirable gases, the horizontal door 269 may then be opened to drop the metal into the furnace pot below.

This drop method of loading the furnace pot may not always be the desirable one, particularly where probability of splashing is to be avoided, as for example, when loading the furnace pot with heavy ingots. Under these conditions, appropriate loading mechanism in the loader, is desirable, which will deposit such heavy items into the molten metal of the furnace below with a minimum of disturbance.

Toward this end, I have developed a chain loading apparatus. This equipment utilizes a pair of parallel spaced chains 281, 283 within the housing, with which to lower an ingot 285 from loading position to a position adjacent the surface of the molten metal in the furnace pot, and then discharge the same into the molten metal from such proximate position.

A shaft 287 journalled in the upper portion of end wall 263 extends through the opposite end wall 261, and carries a crank handle 289 in spaced relationship to the proximate end wall, for manually rotating such shaft.

On that half of the shaft which carries the crank handle, is a concentric sleeve shaft 293 which passes through a bearing in the proximate end wall 261 and serves as a journal for the first shaft. At its exposed end, the sleeve shaft carries a crank arm 295 of a radius comparable to crank arm of the crank handle 289, and has a perforation 297 therein, in alignment with the axis of the crank handle.

The crank handle is provided with a longitudinal bore to receive a latching pin 299 adapted to enter the perforation in the crank arm 295, to couple the two and enable simultaneous rotation of both shafts when so coupled. Upon withdrawal of the pin, the sleeve shaft is rendered inoperative, and the inner shaft may be rotated to the exclusion of the sleeve shaft.

The uncoupling position of the connecting pin may be sensed by a spring-pressed ball 301 installed radially in the crank handle and adapted to enter a groove in the pin, as the pin is withdrawn from its latching position.

Mounted on the horizontal door guide ways 271 and connecting member 275, and paralleling the end walls of the housing in proximity thereto, are a pair of angle sections 305, 307, each provided with a deep horizontal end notch 309 at the end below the concentric shafts 287 and 293, to rotatably receive the ends of a shaft 311 carrying a pair of chain guide spools 313 symmetrically spaced within the loading chamber. Mounted on the one shaft 287 in line with one of the spools, is a chain sprocket 313, while similarly mounted on the sleeve shaft 293 in line with the other spool, is another chain sprocket 315.

The aforementioned chains 281 and 283, each has one end thereof appropriately anchored to a common chain anchoring shaft 319 which is adapted to fit at each end, into an angle notch 321 formed in the opposite end of each angle section.

Each of the chains is then routed under that chain guide spool in front to rear alignment with its point of anchorage to the shaft 319, and then up and over the aligned sprocket above, the remaining free portion of the chain being permitted to drop into a chain storage chamber 325 provided in the proximate side wall of the housing for such purpose.

With the chains so installed, and with both crank arms pin-connected, rotation of the crank handle in one direction, will produce simultaneous rotation of the chain sprockets with a resulting downward looping of the chains, which loops will drop into the furnace pot when the horizontal sliding door is in its open position.

An ingot supported across these chains will accordingly be lowered into the furnace pot toward the level of the molten metal therein. If, prior to reaching the level of molten metal, the sleeve shaft is disconnected, and the remaining shaft is reversely rotated to wind up the loop controlled thereby, the ingot will be caused to elevate at one end and ultimately slide off the chains into the molten metal in the pot.

Following this, the loop may be restored to its previous condition matching that in the other chain, and then both shafts may be connected to simultaneously elevate the chains to prepare them for the loading of another ingot, if such be contemplated.

In the process of tilting an ingot to discharge the same from the chains, precaution must be taken to avoid undesired rotation of the sleeve shaft with corresponding undesired changes in its associated chain, and this may readily be accomplished through the installation of a ratchet 329 on the exposed end of the sleeve shaft adjacent its crank arm, and a co-operating pawl 331 pivotally mounted to the proximate end wall of the housing and provided with an operating handle 333.

For handling different sized ingots, the spacing between the chains should preferably be adjustable to impart stability in the handling of such ingots, and for this purpose, the ends of the chains may be slidably anchored to the chain anchoring shaft 319, while the spools and the chain sprockets may similarly be adjustable along their respective shafts.

When it is desired to dump metal fragments into the furnace pot and accordingly not utilize the chain equipment, the chain anchoring shaft may be lifted from its angle notches 321, and by winding up on both chains simultaneously, such chain anchoring shaft may be withdrawn to the opposite or rear ends of the angle sections and deposited into suitable recesses 337 in the upper edges of the angle sections, where the chain anchoring shaft may be stored, and along with the chains, will be out of the way.

For the guidance of the operator, it would be highly desirable that he have visual access to the interior of the loading chamber, as well as the furnace pot when the horizontal sliding door is in its open position. For this purpose, the roof of the housing is provided with a pair of gas tight or sealed heat resistant glass windows 341, 343 bordering on a metal panel 347 which is removably sealed about a central opening in the roof.

The removability of this central panel is to permit of its replacement by a panel 349 of similar dimensions in which may be adjustably mounted one of a number of tools 351 which one might want to employ in connection with the treatment of the contents of the furnace pot.

The tool is first installed with its functioning end in the loading chamber, and following the purging of such chamber of any atmospheric gases, the horizontal sliding door 269 is then opened and the tool lowered down into the furnace pot to the point where it is to function.

One such tool may be a skimming device, and although the present system, when functioning as a closed system, will minimize the necessity for skimming, some skimming is always desirable, to remove oxides formed on the surfaces of the solid pieces of metal prior to being introduced into the furnace pot.

Other hand tools which may be accommodated in the same manner, include rods for plunging desired additives to the bottom of the molten metal, and devices for stirring the metal in the furnace pot. Removal of the tools will be in the reverse order of their installation, if some necessity exists for the removal thereof during operation of the system.

The tool supporting panel 349 will constitute a metal frame 355 spanned by a flexible diaphragm of silicone rubber or the like, including a boot 359, adapted to slidably receive the shaft of the tool in a sliding friction fit to minimize the probability of leakage of atmosphere into the loading chamber.

One of the prime considerations in the development of the above described loading mechanism, is to afford one the opportunity to periodically load the furnace or treat the molten metal therein without otherwise disturbing the conditions prevailing in the furnace, and if an inert atmosphere is being maintained within the furnace pot or the molten metal itself is being treated to remove gaseous impurities or the like, it becomes of paramount importance that these conditions be not disturbed while loading the furnace.

Maintenance of an inert gaseous atmosphere within the furnace may be accomplished through the utilization of a de-gassing tube assembly 363 supported in the roof of the furnace shell and capable of vertical adjustability without exposing the interior of the furnace to atmosphere.

Such de-gassing tube assembly involves a de-gas tube housing 365 vertically supported in a base assembly 367 which spans an opening in the roof of the furnace shell. Slidably fitting into the housing from below is a stainless steel or other refractory tube 369, to the lower end of which is fitted a foot 371, which may be provided with a main longitudinal passageway 373 connecting with the interior of the furnace pot by a plurality of radiating passages 374 of small diameter. The de-gas tube and its foot are covered with a suitable protective refractory coating 375 as necessary.

At its upper end, the tube 369 may be plugged, and adjacent thereto, the tube may be provided with a handle 377 extending through a vertical slot 379 in the tube housing, to permit of adjustability of the tube and associated foot, the handle being hollow to permit supplying of an inert gas therethrough into the tube for discharge into the furnace pot below. A horizontal notch 381 at the upper end of the slot 379, permits of locking the handle at this point.

The de-gas tube may be employed to initially provide an inert atmosphere within the furnace pot prior to melting of metal therein, and subsequently for de-gassing the metal in its molten condition to remove harmful gases, such as hydrogen from some non-ferrous molten metals for example.

The inert gas employed should be heavier than air. Dry argon gas is excellent for this purpose, as it may be utilized with any metal, but where aluminum alloys are involved, dry nitrogen gas will serve satisfactorily as the inert gas, and might even be preferred because of its lower cost.

The de-gassing tube, however, need not be the sole means for purging the furnace, as more rapid purging may be possible through the aid of an unrestricted tube 382 of adequate diameter, extending into the loader through a wall thereof, or into the furnace pot through the furnace cover.

As the undesired atmosphere within the furnace is being displaced by the inert gas, it may readily escape therefrom by way of the pouring tube and the nozzle, and upon completion of such purging, it would be desirable to block off such escape passage and at the same time, protect the metal in the furnace, upon becoming molten, from possible contamination by the atmosphere.

Provision is made therefore, for the admission of inert gas to the T-coupling 47, which constitutes the highest point within the pouring tube and nozzle combination. Accordingly, upon subsequently tilting the furnace assembly from its "melt" position to its "hold" position, the molten metal, in rising in the pouring tube assembly and approaching the high point therein, will be then protected at this point by the inert gas entering the T-coupling, which gas will then exit from the nozzle to maintain an atmosphere of inert gas within the nozzle also.

Under certain conditions, one may prefer to supply metal to the furnace in molten form rather than in its solid state, and this would permit doing away with the aforementioned loader, and utilizing, in lieu thereof, apparatus adapted for such use.

One such apparatus may take the form of a filling tube 383, comprising a hollow stem 384 terminating at its upper end in a funnel 385, which is closed with a removable cap 386. The filling tube is supported at its funnel end, which funnel, externally, has a hemispherical (or semi-cylindrical) bottom adapted to rest in a complementary hole 387 through a supporting member 388 above the furnace, with the lower end of the filling tube passing frictionally through a combination swivel and sliding joint 389.

Such joint is preferably formed from a block 390 having a longitudinal passageway therethrough to rotatably receive a cylindrical swivel 391, the swivel being provided with a diametrical opening therethrough to slidably receive the hollow stem 384.

To permit tilting of the furnace while allowing the filling tube 383 to remain fixedly installed, the block 390 has a linear recess 392 in both its top and bottom sides, in the plane of swing of the stem 384 relative to the block and of a width exceeding the diameter of the stem. Inasmuch as the furnace tilts to one side of the vertical only, these linear recesses may be offset with respect to each other and extending at one end but slightly beyond the stem.

Such filling tube will be employed when the metal is reduced to molten condition in another furnace, with the furnace of the present invention being used as a pouring and cleansing furnace, or with slight change, may be utilized with an ingot heater, preferably one utilizing the principle of induction heating.

In such latter type of feed device, the filling tube employed, differs slightly from that of the preceding filling tube, in the shape of its funnel 393, which, externally, is spherical or cylindrical, to provide a swivel fit with a socket recess in the bottom of an induction heating receptacle 394. This receptacle is formed with an inclined chamber 395 opening at its discharge end, to the funnel, and adapted at its intake end, to receive ingots fed thereto by gravity, through a feeding tube 396.

Embedded in the walls of the receptacle 394, is a winding 397 to which may be supplied alternating current, such winding being preferably increasingly crowded toward the bottom of the receptacle, to increasingly generate more and more heat in the ingots as they move downwardly in the chamber, and as the ingots melt, the resulting molten metal will flow into the furnace pot below.

An important aspect of the present invention is the provision of means for automatically adjusting the elevation of the furnace assembly to maintain a substantially fixed level of molten metal therein with respect to the nozzle 63 during diminution of the furnace content while pouring, whereby to maintain flow of molten metal from the nozzle, while maintaining the nozzle in its fixed pouring position.

Such means involves a probe assembly 399 in the form of a tube 400 having a small longitudinal bore therethrough, the tube being suspended from a fixed position externally of the furnace assembly, and entering the furnace pot where it terminates at a point representative of the desired fixed or maintained level of molten metal.

If an inert gas is fed into the probe, it will have free flow into the furnace, providing the discharge end of the probe is not blocked. However, should the level of molten metal in the furnace pot be sufficiently high to block off the probe discharge, then a pressure will build up in the probe.

Utilizing these two different conditions to generate a signal for controlling the furnace elevation drive motor 115, the probe may be relied on to substantially stabilize the liquid level of the molten metal at a point of elevation adjacent the discharge end of the probe.

The probe is supported from an overhang bracket 401 affixed to one of the furnace supporting channels 93, and extends into the furnace pot through the cover 30 of the shell. In order to enable the probe to adjust itself to the tilting movements of the furnace assembly, the overhang bracket carries a semi-cylindrical seat arrangement 402 in which is cradled a cylindrical cross-arm 403 through which the probe tube passes and to which it is affixed.

Where the probe passes through the cover of the furnace shell, it enters through a combination swivel and sliding joint 404, which will be similar to that through which the filling tube 383 passes on its way into the furnace.

A gas supply line 413 for conveying nitrogen or other inert gas, to the upper end of the furnace probe, includes a valve 414 for shutting off the flow when the furnace probe is not in operation and a pressure switch 415 which functions as a flow check which responds to an inadequacy or complete loss of gas flow to control a warning or alarm circuit.

Beyond 415 a restriction 416 serves as a throttle to control a relatively small quantity of inert gas flow through the probe and to maintain a suitable low gas pressure beyond the restriction. Pressure switches 417 and 418 are connected in parallel between the supply line 413 to the probe and a connection 420 to the interior of the furnace, whereby each of these pressure switches will be exposed to the prevailing differential pressure between the gas within the probe and the gas within the furnace pot. Pressure switch 417 is set to respond at a differential pressure slightly above that when the probe discharge is completely free, and when the probe pressure is below this set differential pressure, it controls an electrical circuit which causes the furnace to rise. Pressure switch 418 is adapted to respond to a higher differential pressure, such as develops when the liquid level in the furnace rises sufficiently to block the discharge end of the probe, and it controls a circuit which causes the furnace to lower.

To prevent a hunting action when pressure switches 417 and 418 are operating, their set pressures must be separated enough so that furnace movements stopped by one pressure switch will not extend to activate the other pressure switch.

Due to the control exercised by the two pressure switches, 417 and 418, the liquid level in the furnace will hover about a fixed elevation adjacent the probe discharge end, whereby pouring may be maintained while the nozzle is held at its fixed "pour" position.

Normal permissible travel of the furnace is controlled in the downward direction, by a lower limit micro-switch 421 mounted, for example, on the underside of the carriage block 113 and adapted to engage a stop 422 on the proximate crossbar 114, to bring about a halt to such downward movement.

In the upward direction of travel, a probe safety limit micro-switch 423 is mounted on an end of one of the carriage blocks 113 in position to engage cam bar 424 affixed to the inner side of a flange of the channel, to halt upward travel of the furnace just prior to the bottom of the furnace pot reaching the furnace probe. This is to protect the probe against damage, though at this stage, some molten metal still remains in the furnace pot.

To completely empty the furnace, as when it is desired to charge the furnace with a different metal or alloy, it becomes incumbent then to elevate the furnace further, and provision is made for controlling this operation manually, but not until the probe has been removed to avoid damage thereto.

Toward this end, the aforementioned upper limit switch 423 is of the single pole double throw type, so that when automatically actuated by engaging the cam bar 424, it will automatically shift to a manual circuit to enable controlling the furnace drive motor in its upward direction of travel above that point.

In such manual circuit, is a micro-switch 425 of the normally open type, mounted on the probe supporting bracket 401 in position to be engaged by the probe structure, and held thereby in open condition until the probe is removed. Thus with this safeguard, additional elevation of the furnace cannot occur until the probe is first removed.

A third micro-switch 427 at a higher point, on the channel 93, is located so as to be engaged by the carriage block, to determine the ultimate upper limit to which the furnace may travel, the cam bar 424 being of sufficient length to maintain engagement with the probe safety limit switch 423 up to such point, so as to maintain the manual circuit operative.

A scale 429, calibrated in terms of a full to empty furnace, may be installed on the channel 93, to be traversed by an indicator 431 carried, for example, by the proximate carriage block 113.

Associated with the nozzle is a probe 435, which is mounted alongside the nozzle assembly 45 for movement therewith, and terminates short of the tip of the nozzle by a matter of about three quarters of an inch. It is adapted to enter with the nozzle into the pouring opening of a mold, and its purpose is to act as a control in causing the mold platform and the mold carried thereby, to back off or recede from the nozzle as the level of molten metal being poured into the mold rises, it being recalled that during pouring, the nozzle remains stationary as to elevation.

For this purpose there is associated with the mold probe, a pressure switch 436 adapted to respond to an increase in gas pressure in the probe, created when the liquid level in the mold rises sufficiently to block the lower end of the probe, and as the pressure switch responds, it closes a circuit which results in energizing the mold platform motor 221 in its downward direction of rotation.

A second pressure switch 437, of higher pressure rating than the first is adapted to respond to an inadequacy or total loss of gas pressure, to either sound an alarm or shut down operations. Between pressure switches 436 and 437 a restriction 438 serves as a throttle to control a relatively small quantity of inert gas flow through the mold probe and to maintain a suitable low gas pressure beyond the restriction.

Permissible travel of the mold platform is controlled, as to its lowermost position, by a lower limit switch 440 mounted at any convenient location, where it will be actuated by the mold platform or an actuator associated therewith, when the platform reaches its desired lowermost position. In its upward travel, the ultimate limit is controlled by an upper limit switch 441 adapted to be actuated when the mold platform reaches such ultimate limit of travel.

However, upward movement of the mold platform, will usually be stopped before reaching such ultimate limit, and this will be determined by the elevation of the mold platform when a mold carried thereon, is at proper elevation for pouring. This is pre-established by vertical adjustment of a micro-switch 442 in the path of movement of a cam 443 carried by the mold platform 7, the micro-switch 442, when actuated, functioning to control a circuit which first causes a heavy flow of inert gas to the mold, followed by movement of the nozzle from its "hold" position to its "pour" position. The manner in which this sequential function is accomplished will be described in connection with the circuitry involved.

Following initiation of the pouring operation, the mold probe 435 takes over control by causing the mold platform to back down as the mold fills, until the mold is full, at which point, pouring is to stop.

This is controlled by another micro-switch 444 adjustable as to elevation, in the path of the cam 443, to be engaged during downward travel of the mold, when pouring of the mold should cease, and when so actuated, the nozzle is restored to its "hold" position from its "pour" position, and the mold platform continues its downward travel until its lower limit switch 440 is engaged.

Representative electrical circuits for controlling operations of the above described apparatus, including circuits controlled by the pressure switches, will be subsequently described in greater detail, following a description of the air and inert gas lines involved in the system of the present invention.

While the drive motors 115 and 221, for driving the furnace assembly and the mold platform respectively, may be electrical, I prefer to utilize air motors by reason of simplification of required equipment, smoother operation, and ease of control, in addition to the fact that the source of air supply for such motors may also be utilized in supplying air to the burner 33 for proper mixture with the gas supplied to the burner.

Accordingly, the air supply source feeds into a main line 449 which branches into parallel air lines 451, 453 to the furnace drive motor 115 with similar parallel air lines 455, 457 to the mold platform drive motor 221, and a single line 459 to the burner 33. One of each of the pairs of branch lines, controls operation of its associated air motor in one direction, while the remaining branch determines reverse rotation of the same motor.

In each of the branch lines 451 and 453 to the furnace drive motor 115 is a solenoid operated valve 461, 463 respectively, while similar solenoid operated valves 465, 467 are located in the branch lines 455 and 457 respectively, to the mold platform drive motor 221. A similar solenoid operated valve 469 may be located in the air line 459 to the burner.

Another air line 470 leads to a solenoid controlled reversing valve 471 adapted, in the de-energized condition of its solenoid, to maintain air in that end of the tilt cylinder 131 which causes the nozzle to be retained in its "hold" position, but upon energization of the valve solenoid, the air will be switched to the opposite end of the cylinder to bring about tilting of the nozzle to its "pour" position.

Inert gases for use in connection with the molten metal in the system, are available commercially, bottled under pressure in small tanks, and where nitrogen is to be utilized as the inert gas, two or more tanks 475 thereof, are preferably ganged to feed into a main line 477 for connection to each of a pair of manifolds 479, 481 through suitable flow indicators 483. The main feed line may include a main solenoid controlled valve 485 and necessary pressure reducers 487 . . . etc. and a drying tower or in the alternative, a cold trap 489, when the same are deemed desirable. A drying tower removes moisture by drying the gas, while a cold trap removes it by condensing it out through exposure of the gas to extremely low temperature as provided by a liquefied gas such as nitrogen.

One of the manifolds 479 is for supplying the furnace assembly with its requirements of inert gas, while the other manifold 481 is relegated to supplying the nozzle assembly 45 and associated probe 435 with its inert gas requirements, and other inert gas requirements for the molds.

One gas supply connection 493 from the furnace assembly manifold leads to the furnace purge tube 382, another 495 to the de-gas tube assembly 363, a third connection 497 may lead to a tube 499 supported in the replaceable center panel of the loader assembly, for auxiliary metal de-gassing, while a fourth connection 413, was previously mentioned as connecting to the furnace probe assembly 399.

It may be advantageous in handling molten aluminum and similar metals, to include with the nitrogen gas, a small amount of chlorine gas, and when chlorine gas is to be added, a bottle 507 of such gas under compression, is connected by a line 509 to the nitrogen gas line 495 which feeds the de-gas tube assembly 363. The chlorine gas feed line 509 when employed, may also include a drying tower 511 and a flow indicator 513.

From the manifold 481, which supplies the nozzle and mold requirements, a feed line 517 connects to the upper end of the T-coupling through a pressure reducer 491 and a restriction 518 to set a lower flow to the nozzle. Shunting the restriction, to provide a higher flow through the nozzle under certain conditions, is a branch passage 519 controlled by a solenoid operated valve 520. The function of pressure reducer 491 is to prevent a build-up of pressure in the T junction which would interfere with the flow of metal through the nozzle.

A second feed line 521 connects to the mold probe 435, and a third line 522 leads to a gas flooder 523, which is adapted to be positioned about the fill opening to a mold, as well as the nozzle when in its pouring position.

The gas flooder involves a pair of side walls 524 connected by an end wall 525 fixed thereto, and an opposing end wall 526 resiliently hinged between the side walls and terminating at its upper end in an outwardly directed lip. When employed, it is positioned about the pouring opening to a mold with the hinged end wall positioned beneath the pouring tube assembly, whereby upon lowering the nozzle to its "pour" position, the pouring tube assembly, should it strike the resiliently hinged wall, will merely deflect it outwardly. The function of this flooder is to provide a protective flow of inert gas from perforated tube 527 supplied by line 522.

A fourth connection 535 from the manifold 481, connects to a mold purge assembly 537, which involves an inverted funnel 539 adapted to fit into the filling opening to a mold and be supported in position by a spider 541, slidably adjustable on the feed line adjacent the funnel discharge end. Such mold purge is preferably employed in purging a mold as it is being conveyed toward the mold platform.

In the electrical circuitry for controlling the functioning of the aforementioned apparatus, and to which reference will now be made, power is derived from a conventional A.C. power source 567 through a conventional transformer and rectifier arrangement 569 to provide a source of direct current, the transformer being of the step-down type to provide a direct current voltage of lower value than the line voltage. Direct current conveniently permits of the use of diodes in the circuitry. The negative side of the D.C. source thus provided, is connected to the switching element of a single pole double throw switch 571, the switching element of which is adapted to be moved between a system "on" contact and a system "off" contact. The position side of the D.C. voltage source is connected to a ground line 575.

With the switch 571 in its "off" position, power will be applied by way of a diode 579 and the furnace lower limit switch 421 through the winding of solenoid valve 461 which controls the downward travel of the furnace assembly, and then to ground. Accordingly, with the switch 571 in its "off" position as indicated, the furnace assembly, if in an elevated position, will move downward until the lower limit switch 421, associated with the furnace drive, is opened and further movement will cease. The furnace will remain in this position in the absence of any subsequent changes in the circuit adjustments.

With the switch in its "on" position, power will be applied to an "on" line 581 which connects in parallel to the pressure responsive element of the furnace flow check switch 415, the mold probe flow check switch 437, and the mold probe pressure switch 436 which latter governs the downward movement of the mold platform and mold, as the molten metal rises in the mold.

The normally closed contact of the furnace flow check switch 415 is connected through a diode 585 to any suitable alarm system, preferably some type of audible alarm, to indicate an absence of required gas flow to the furnace probe during normal operation of the apparatus. This same pressure switch contact is also connected through a diode 587 to the furnace "down" solenoid 461, to drive the furnace to its lowermost position, should it happen to be at an elevated position when the gas flow ceases.

The normally open contact of the furnace flow check switch 415 is connected in series with the normally closed contacts of both the higher pressure and lower pressure switches 418 and 417 respectively, to the furnace "up" solenoid 463, by way of the furnace upper limit switches 423 and 427 whereby, when the tip of the furnace probe is in spaced relationship to the liquid level in the furnace, the furnace will move up to bring the liquid level into sufficiently close relationship to the probe as to cause the lower pressure switch 417 to open the circuit and bring the furnace drive to a halt.

On the other hand, should the liquid level rise above the discharge end of the furnace probe, the higher pressure switch 418 will then be caused to switch to its normally open contact to drive the furnace down, to establish a condition of stability.

This is accomplished by a connection from the normally open contact of the higher pressure switch 418 through a diode 588 to the furnace "down" solenoid 461 by way of the furnace lower limit switch 421.

If metal is being poured from the furnace, the liquid level will be in a continual state of change, and the pressure switches 417 and 418 will intermittently function to re-establish the liquid level, within small increments of time, so that for all practical purposes, the liquid level in the furnace may be deemed to be maintained substantially stable, adjacent the discharge end of the furnace probe.

The mold probe flow check switch 437, in its normal state, will represent inadequate or complete loss of gas flow to the mold probe 435, and to apprise an operator of such loss, the normally closed contact of this pressure switch is connected through a diode 595 to any suitable alarm system.

For normal operation with gas flowing to the mold probe, this pressure switch will change over to its energized position making power available to the start-pour switch 442 and timer solenoid auxiliary contacts 635. With the start-pour switch in its normal or unactuated position, power may flow through the normally closed contacts 599 to the pole of mode selector switch 600. If this mode selector is in "automatic" mode, power is made available to the pole of mold locator switch 200.

Upon removal of the mold locator pin 194 from its home or storage position, to position a mold, the associated switch 200 completes a circuit to the winding of a relay 605, which upon becoming energized, closes a pair of normally open relay contacts 607. No action can take place now because this circuit is isolated via diode 611. However, capacitor 615 begins charging through resistor 617.

When the mold locator pin is returned to its home position, the mold locator switch 200 will assume its previous position. Capacitor 615 will then discharge across winding 605, keep it energized until power can flow through contacts 607, and diode 611 to winding of relay 605, locking relay 605 in. The capacitor is isolated and kept from discharging through associated circuitry by diode 611. At this time power will also flow through diode 609 and upper limit switch 441 to the "platform up" solenoid valve 467. Diode 609 also isolates winding 605 and its associated circuitry in the event that the manual "platform up" switch 705 is actuated.

With the circuit thus completed through the mold platform "up" valve 467, the mold platform, with the mold now properly positioned thereon, will then begin to move upward, past the cease pour micro-switch 444, which though actuated, completes no circuit during this upward travel of the mold platform.

Upon reaching and actuating the start pour switch 442, the status of the start pour switch changes, to open the circuit to the mold platform "up" valve 467 and close a circuit through a diode 618, a manually closed switch 619, the prevailing closed contacts of the cease pour switch 444, through a normally closed manual switch 620 to a parallel circuit. One branch of this parallel circuit connects through a diode 623 to the winding of a timer solenoid 625, while the other branch passes through a pair of normally closed contacts 627 associated with the timer solenoid, and connects to a purge control solenoid 631.

The timer solenoid has associated therewith, in addition to the normally closed contacts 627, two pairs of normally opened contacts 635 and 637, the one pair of normally open contacts 637 and the normally closed contacts 627 being both pneumatically or otherwise delayed in responding to the energization of the timer solenoid, leaving the contacts 635 to function as fast acting auxiliary contacts.

During the delay period, which may be of the order of one to thirty seconds or so, the purge control solenoid 631 functions to open the valve 520 which permits increased flow of nitrogen gas through the nozzle to the mold to further purge the mold just prior to pouring of metal therein.

The delay period is terminated by the opening of the normally closed timer solenoid contacts 627 to break the circuit to the purge control solenoid 631 and reduce gas flow through the nozzle to normalcy, and the closing of the normally open contacts 637 to complete a circuit to a pour solenoid 641 which functions to ultimately bring the nozzle to its "pour" position.

As the mold platform with its supported mold, lowers in response to the liquid level rising in the mold, the start pour switch 442 will then be restored to its previous status, and would normally open the circuit to the timer solenoid 625 and the pour solenoid 641, were it not for the fact that the fact acting contacts 635 associated with the timer solenoid will long since have completed a holding circuit for both the timer solenoid and the pour solenoid.

The lowering of the mold continues with the rise of liquid level therein until the mold platform strikes the cease pour switch 444 and alters its position, whereupon the holding circuit for the timer solenoid 625 and the pour solenoid 641 will be opened. The cease pour switch 444, as it opens such holding circuit, will, at the same time, attempt to establish a circuit through a diode 643 and mold platform lower limit switch 440 to a relay 647.

To assure, however, that the practically simultaneous opening of the fast acting contacts 635 associated with the timer solenoid might not preclude establishment of such circuit through the relay 647, the timer solenoid is shunted with a resistance 649 in series with a diode 651, whereupon the energy stored up in the solenoid winding, will, upon opening of this holding circuit by the cease pour switch 444, circulate uni-directionally through the timer solenoid to maintain energization thereof for the brief moment of time required by the cease pour switch to change its status and complete a circuit through the relay 647.

This relay 647 has associated therewith, two pairs of normally open contacts 657 and 659, one pair 657 of which closes, to immediately establish a holding circuit to the relay from the "on" line 581 through a normally closed manually operable mold platform "up" switch 665; the other pair 659 of normally open contacts, also closing to complete a circuit through the same normally closed manually operable mold platform "up" switch 665 to the mold platform "down" solenoid valve 465 by way of the mold platform lower limit switch 440.

Thus, following engagement of the cease pour switch by the mold platform while traveling down, the mold platform will continue to move downward until its lower limit switch is automatically opened to de-energize both the relay 647 and the mold platform "down" solenoid valve 465, and thus bring the mold platform to a halt.

When and if it is found necessary or desirable to completely empty the furnace of all molten metal, the furnace probe 399 should be removed to preclude probable damage thereto, due either to the excessive tilting of the furnace assembly, or to being engaged by the bottom of the furnace pot. Accordingly, manual control of the furnace assembly would be in order, and a provision must therefore be made to change over from probe control to manual control.

One step in this direction, as previously described, is to provide the micro-switch 425 at the point of suspension of the furnace probe, to either support the weight of the probe or otherwise respond to its presence, so as to maintain normal circuit connections while the probe is in place and being utilized.

Such switch will have a normally open and a normally closed contact, and will be connected in the "on" line 581 to the furnace flow check pressure switch 415 with its normally open contact in such line, whereby, upon installation of the probe, such normally open connection will be closed to maintain normal circuitry and is shown in such position in the drawings.

In the circuit to the furnace "up" solenoid 463, will be installed the cam operated switch 423 adapted to switch from one contact in the normal furnace "up" solenoid circuit to a second contact not includes in such circuit.

The normally closed contact (shown open in the circuit diagram in the drawings) of the furnace probe switch 425 is connected to parallel circuits, one of which connects to a normally open manual switch 671, through a diode 673, to the normally open contact of the cam operated switch 423. When switched over to this second contact, a circuit will be completed through the upper limit switch 427 whereby the furnace may be manually controlled in its upward movement by switch 671, beyond the normal upper limit as controlled by the probe.

The other of the parallel circuits includes a connection through a normally open manually operable switch 677, a diode 679, and a lower limit switch 421 to the furnace "down" solenoid 461 whereby downward movement of the furnace assembly may also be manually controlled in the absence of the furnace probe.

Shunting many of the windings of the various relays and solenoids in the circuits described above, are a diode 699 in series with a resistance 700, the function of which is to uni-directionally absorb the energy in such windings, upon opening of the circuits thereto, to eliminate transient voltage "spikes" which can damage relay contacts and associated control devices.

The circuits as thus described, permit automatic or semi-automatic functioning of the apparatus described, but on occasions, it becomes desirable to be able to manually control such operations, and the circuitry has been designed to permit of conversion thereof from such automatic or semi-automatic operation to manual control.

Toward this end, the manually closed switches 600, 619, are ganged for simultaneous opening and closing; the normally closed manually operable switch 599 has a normally open, manually operable switch 701 mechanically coupled thereto for simultaneous operation; the normally closed manually operable switch 665 likewise has a normally open manually operable switch 705 mechanically coupled therewith for simultaneous operation.

The open switch 701 is electrically connected in series with the switch 665 in circuit with the "down" solenoid valve 465 associated with the mold platform, while the open switch 705 is connected in series with the normally closed switch 599 in a circuit to the "up" solenoid valve, also associated with the mold platform.

Additionally, a normally open manually operable start pour switch 707 is connected in shunt across the normally closed switch 619.

With the foregoing few changes, and following opening of the normally closed switches 600, and 619, it will be apparent that by closing the manual switch 705, a circuit will be completed through the "up" solenoid valve 467 to drive the mold platform upward, while the simultaneous opening of the normally closed manual switch 665 will open the circuit leading through the contacts 657 and 659 to the relay 647 and "down" solenoid valve 465 associated with the mold platform. Thus under no conditions can the "down" solenoid valve be energized while the "up" solenoid valve is functioning.

On the other hand, by manually closing the switch 701 a circuit will be completed through the "down" solenoid valve 465 to drive the mold platform downward, while the simultaneous opening of the normally closed switch 599 will positively assure that the "up" solenoid valve cannot be simultaneously energized under any conditions.

Following elevation of a mold to the point where the mold platform engages the start pour switch 442, the purge solenoid 631 and the pour solenoid 641 will not be sequentially energized as previously described, because of the now open condition of the normally closed switch 619.

However, by manually closing the switch 707 to shunt the now open switch 619, the sequential energizing circuits will then be completed, and as a result, the mold will first be purged with inert gas, and then the nozzle will be lowered into pouring position to pour the mold.

Various signal and indicating lights 713 may be included in the electrical system to indicate functioning of the respective circuits with which they are associated, and wherever such a signal or indicating light is desired.

One such signal light 715 is connected by an open switch 717 between the cease pour switch 444 and ground. By coupling the switch 717 to the closed switch 620 for simultaneous operation, it becomes apparent that upon manually opening the circuits to the purge solenoid 631 or the pour solenoid 641 at the switch 620, light 715 will go on to indicate this.

To indicate whether the system is on manual, or automatic operation, a pair of such lights 725, 727 will, by means of a single-pole, double-throw switch 729, be selectively connected between the "on" line and the "ground" line, the operational position of such last mentioned switch being determined by ganging it with the normally closed manual switches 600 and 619.

The precise control which the foregoing apparatus provides over the metal processed thereby, enables one to obtain a casting in which the metal is of exceptionally high quality, and exceeding substantially, the premium quality requirements of the military branch of the government. For example, the requirements for cast aluminum alloy A356 (premium quality) are that it have a tensile strength of 38,000 lbs./sq. in. and an elongation of 5.00%, for any casting process, permanent mold, or sand mold in which chills may be used.

Utilizing the equipment of the present invention with a sand mold in which no chills are employed, castings of the same alloy averaged 39,659 lbs./sq. in. and an elongation of 6.60%, thus exceeding the aforementioned premium quality by 1659 lbs./sq. in. in tensile strength and 1.6% in elongation.

And when such sand molds employ chills, the tensile strength of the resulting cast alloy jumped to 45,239 lbs./sq. in. and elongation to 17.80%. When compared to premium quality requirements, this represents an increase of 7239 lbs./sq. in. in tensile strength and 12.8% in elongation.

The accomplishments of the present invention, when compared to prior art standard quality castings which provide a guaranteed minimum of but 22,500 lbs./sq. in. tensile strength and an elongation of but .75%, become even more startling, when one takes note of the fact that an average sand casting of A356 aluminum alloy obtainable by applicant, without use of chills, raises the tensile strength 17,159 lbs./sq. in. and increases elongation 8.8 times; while a similar sand casting obtainable by applicant with use of chills, will more than double the tensile strength of a prior art standard quality casting, and will multiply elongation more than 23 times.

Aside from the foregoing, the present invention brings about a substantial reduction in loss of aluminum metal attributable to oxidation and spillage. With the more volatile and combustible magnesium metal, it is anticipated that the current range of loss of 10–60% experienced with prior art methods and apparatus, may be reduced to approximately 2% and probably less, due to the ability to maintain the molten metal in a protective inert atmosphere from the melting stage to the completion of pouring.

From the foregoing description of my novel and improved system of casting, it will be apparent that the same is subject to alteration and modification without departing from the underlying principles involved, and while I have illustrated and described the same in considerable detail, I do not desire to be limited in my protection to the specification details illustrated and described except as may be necessitated by the appended claims.

I claim:

1. Apparatus for filling a receptacle to a predetermined level comprising
   a holder for material to be poured into such receptacle, said holder having a useful capacity to fill a plurality of said receptacles,
   a pouring passageway extending from said holder,
   a nozzle assembly affixed to the end of said pouring passageway and including a nozzle,
   means for establishing a flow of material from said nozzle by way of said pouring passageway,
   a receptacle supporting platform at a vertical spacing from said nozzle assembly,
   means for reducing the vertical spacing between said platform and said nozzle assembly whereby to bring a receptacle to a position with said nozzle in the receptacle and in proximity to the floor thereof,
   means, following engagement of the tip of said nozzle assembly by rising level of material during pouring, for separating said platform and nozzle assembly while maintaining such engagement between said nozzle assembly and the rising level of such material during such pouring, said means for separating said platform and nozzle assembly including liquid level sensing means having a sensing component carried by said nozzle assembly and adapted to enter said receptacle with said nozzle assembly, and means responsive to contact of said flowable material with said sensing component for producing a separating movement between said platform and nozzle assembly during said contact,
   and means for shutting off such flow of material upon the filling of such receptacle to such predetermined level.

2. Apparatus in accordance with claim 1 characterized by said level sensing means component as comprising a tube terminating in an open end adjacent the tip of said nozzle assembly, and said level sensing means as including in addition to said tube, pressure responsive means flow-coupled to said tube and adapted to respond to a change in pressure in said tube, occasioned by the open end of said tube being closed off by rising level of flowable material in said receptacle, and said means for producing a separating movement between said platform and nozzle assembly including means controlled by said pressure responsive means while said tube end is so closed off.

References Cited

UNITED STATES PATENTS

| | | | |
|---|---|---|---|
| 1,923,119 | 8/1933 | Seidel | 222—567 |
| 1,983,580 | 12/1934 | Nock | 137—146 |
| 2,222,923 | 11/1940 | Warrick | 141—225 |
| 2,713,705 | 7/1955 | Lapin | 164—157 |
| 3,122,800 | 3/1964 | Naffziger | 164—155 |
| 3,137,903 | 6/1964 | Morton | 164—312 |
| 3,157,493 | 11/1964 | Robinson | 75—89 |
| 3,160,929 | 12/1964 | Woodburn | 164—155 |
| 3,174,737 | 3/1965 | Olsson | 164—336 X |
| 3,187,394 | 6/1965 | Tama et al. | 164—155 |
| 3,252,187 | 5/1966 | Buckett | 222—70 |
| 1,915,635 | 6/1933 | Weidemann et al. | 22—209 |
| 2,050,873 | 8/1936 | Zickrick | 22—214 |
| 2,060,134 | 11/1936 | Summery | 266—33 |
| 2,385,206 | 9/1945 | Hopkins | 22—209 |

FOREIGN PATENTS

| | | |
|---|---|---|
| 184,309 | 1/1956 | Austria. |
| 169,328 | 11/1959 | Sweden. |

J. SPENCER OVERHOLSER, *Primary Examiner.*

R. D. BALDWIN, *Assistant Examiner.*